US012766696B2

(12) United States Patent
Hanlon

(10) Patent No.: US 12,766,696 B2
(45) Date of Patent: Oct. 20, 2026

(54) WORKBENCH AND RACK AND ACCESSORIES THEREFOR

(71) Applicant: Perfect Site LLC, Las Vegas, NV (US)

(72) Inventor: Jared W. Hanlon, Las Vegas, NV (US)

(73) Assignee: Perfect Site LLC, Las Vegas, NV (US)

( * ) Notice: Subject to any disclaimer, the term of this patent is extended or adjusted under 35 U.S.C. 154(b) by 457 days.

(21) Appl. No.: 18/195,285

(22) Filed: May 9, 2023

(65) Prior Publication Data

US 2023/0398678 A1 Dec. 14, 2023

Related U.S. Application Data

(60) Provisional application No. 63/340,325, filed on May 10, 2022.

(51) Int. Cl.

| | |
|---|---|
| ***B25H 1/12*** | (2006.01) |
| ***A47B 47/00*** | (2006.01) |
| ***A47B 55/02*** | (2006.01) |
| ***A47B 57/40*** | (2006.01) |
| ***A47F 5/00*** | (2006.01) |
| ***A47F 5/01*** | (2006.01) |
| ***A47F 5/08*** | (2006.01) |
| ***A47F 5/10*** | (2006.01) |

(52) U.S. Cl.

CPC ........... *B25H 1/12* (2013.01); *A47B 47/0083* (2013.01); *A47B 55/02* (2013.01); *A47B 57/402* (2013.01); *A47F 5/0018* (2013.01); *A47F 5/01* (2013.01); *A47F 5/101* (2013.01); *A47F 5/0823* (2013.01)

(58) Field of Classification Search

CPC ....... B25H 1/12; A47B 47/0083; A47B 55/02; A47B 57/402; A47F 5/0018; A47F 5/01; A47F 5/101; A47F 5/0823

See application file for complete search history.

(56) References Cited

U.S. PATENT DOCUMENTS

| | | | | |
|---|---|---|---|---|
| 2,160,174 A * | 5/1939 | Scalera | .................. | F16B 12/60 5/296 |
| 2,319,470 A * | 5/1943 | Nobles | .................... | F25D 25/02 211/153 |
| 2,374,550 A | 4/1945 | McIntosh | | |

(Continued)

FOREIGN PATENT DOCUMENTS

| | | |
|---|---|---|
| CN | 201064290 | 5/2008 |
| CN | ZL 201510294195.X | 7/2020 |

(Continued)

OTHER PUBLICATIONS

Notification of Transmittal of the International Search Report. Dated Dec. 7, 2021. PCT/US2021/050531.

*Primary Examiner* — Stanton L Krycinski
(74) *Attorney, Agent, or Firm* — Snell & Wilmer LLP

(57) ABSTRACT

Aspects of the invention comprise work benches and racks (which may comprise wall mounted racks or racks with elevated supported shelves or the like), such as storage and mounting racks. Additional aspects of the invention comprise features of, or accessories for, such workbenches or racks, such as frame assemblies, notched shelf beams, drawers, pegboards, decking (such as wire decking) and the like. Yet other aspects of the invention comprise methods of manufacturing, packing/shipping and assembling such workbenches and racks.

14 Claims, 31 Drawing Sheets

(56) References Cited

U.S. PATENT DOCUMENTS

| | | | | | |
|---|---|---|---|---|---|
| 2,528,358 | A * | 10/1950 | Grass | A47H 1/122 | 248/222.51 |
| 2,564,478 | A * | 8/1951 | Harbison | F25D 25/02 | 312/351 |
| 2,604,213 | A | 7/1952 | Bales et al. | | |
| 2,918,176 | A | 12/1959 | Bell et al. | | |
| 2,919,816 | A * | 1/1960 | Maslow | A47B 55/02 | 403/217 |
| 2,925,920 | A * | 2/1960 | Skubic | A47B 57/402 | 108/107 |
| 2,932,368 | A | 4/1960 | Schell, Jr. | | |
| 3,027,016 | A * | 3/1962 | Becht | A47B 55/02 | 211/153 |
| 3,042,221 | A | 7/1962 | Rasmussen | | |
| 3,072,262 | A | 1/1963 | Cassel | | |
| 3,193,060 | A | 7/1965 | Park | | |
| 3,194,407 | A | 7/1965 | D'Altrui | | |
| 3,221,894 | A | 12/1965 | Knuth | | |
| 3,235,038 | A | 2/1966 | Nesslinger | | |
| 3,252,434 | A * | 5/1966 | Young, Jr. | A47F 5/13 | 211/181.1 |
| 3,278,149 | A * | 10/1966 | Brucker | E04G 7/02 | 211/208 |
| 3,285,428 | A | 11/1966 | Scheck | | |
| 3,475,044 | A | 10/1969 | Konstant | | |
| 3,625,372 | A | 12/1971 | MacKenzie | | |
| 3,647,080 | A | 3/1972 | Denny | | |
| 3,741,405 | A | 6/1973 | McConnell et al. | | |
| 3,858,996 | A | 1/1975 | Jarvis | | |
| 3,862,691 | A | 1/1975 | Mori et al. | | |
| 3,900,111 | A | 8/1975 | Hiler et al. | | |
| 3,904,162 | A * | 9/1975 | O'Konski | E04B 2/763 | 248/222.52 |
| 3,986,462 | A | 10/1976 | Heft | | |
| 4,030,612 | A | 6/1977 | Gray | | |
| 4,064,996 | A * | 12/1977 | Shillum | A47B 57/402 | 108/107 |
| 4,078,664 | A | 3/1978 | McConnell | | |
| 4,088,229 | A | 5/1978 | Jacoby et al. | | |
| 4,101,233 | A | 7/1978 | McConnell | | |
| 4,142,638 | A * | 3/1979 | Vargo | A47B 57/34 | 211/187 |
| 4,150,753 | A * | 4/1979 | Stahl | A47B 96/067 | 248/251 |
| 4,154,419 | A * | 5/1979 | Breidenbach | A47B 57/402 | 211/187 |
| 4,165,698 | A | 8/1979 | Ferdinand | | |
| 4,179,143 | A | 12/1979 | Shy | | |
| 4,197,952 | A | 4/1980 | De Fouw et al. | | |
| 4,236,642 | A | 12/1980 | Klein | | |
| 4,262,809 | A | 4/1981 | McConnell | | |
| 4,316,546 | A * | 2/1982 | Varon | A47B 57/42 | 248/251 |
| 4,316,547 | A * | 2/1982 | Varon | A47G 25/0692 | 211/124 |
| 4,342,397 | A * | 8/1982 | Halstrick | A47B 57/402 | 403/231 |
| 4,423,817 | A | 1/1984 | Monjo-Rufi | | |
| 4,455,007 | A * | 6/1984 | Varon | A47B 96/061 | 248/300 |
| 4,545,490 | A | 10/1985 | Hsiao et al. | | |
| 4,549,665 | A | 10/1985 | Smitley | | |
| 4,645,276 | A | 2/1987 | Flavigny | | |
| 4,646,658 | A * | 3/1987 | Lee | A47B 96/025 | 108/62 |
| 4,648,517 | A | 3/1987 | Schafer | | |
| 4,722,648 | A * | 2/1988 | Camilleri | F16B 19/1081 | 248/250 |
| 4,735,325 | A * | 4/1988 | Remmers | A47B 96/068 | 211/187 |
| 4,742,782 | A | 5/1988 | Miller | | |
| 4,796,541 | A | 1/1989 | Halstrick | | |
| 4,874,148 | A * | 10/1989 | Guinter | A47B 57/42 | 248/220.22 |
| 4,955,490 | A * | 9/1990 | Schafer | A47B 96/02 | 211/187 |
| 4,996,929 | A | 3/1991 | Saal | | |
| 5,011,031 | A * | 4/1991 | Konstant | A47B 47/027 | 211/192 |
| 5,012,938 | A | 5/1991 | King | | |
| 5,027,959 | A * | 7/1991 | Luukkonen | A47B 47/021 | 211/186 |
| 5,190,171 | A | 3/1993 | Christman, Jr. | | |
| 5,190,172 | A | 3/1993 | Tyson | | |
| 5,194,407 | A | 3/1993 | Waisala et al. | | |
| 5,263,296 | A | 11/1993 | Spera | | |
| D342,328 | S * | 12/1993 | Granstrom | D25/126 | |
| 5,284,311 | A * | 2/1994 | Baer | A47B 57/402 | 403/381 |
| 5,463,966 | A | 11/1995 | Nilsson | | |
| 5,628,415 | A | 5/1997 | Mulholland | | |
| 5,695,080 | A * | 12/1997 | Martin | F16B 12/38 | 211/183 |
| 5,823,292 | A | 10/1998 | Krause | | |
| 5,823,392 | A | 10/1998 | Madico | | |
| 5,845,453 | A * | 12/1998 | Goya | F16B 9/058 | 403/189 |
| 5,845,795 | A | 12/1998 | Mulholland | | |
| 6,164,194 | A * | 12/2000 | Westmoreland | A47J 43/18 | 99/449 |
| 6,223,494 | B1 | 5/2001 | Bright | | |
| 6,332,548 | B1 | 12/2001 | West | | |
| 6,341,704 | B1 * | 1/2002 | Michel, Jr. | D06F 95/002 | 211/119.011 |
| 6,409,031 | B1 * | 6/2002 | Wynne | A47B 55/02 | 211/175 |
| 6,510,955 | B2 | 1/2003 | Pellegrino | | |
| 6,604,640 | B1 | 8/2003 | Jehin | | |
| 6,663,204 | B2 * | 12/2003 | Atalla | A47B 96/025 | 211/153 |
| 6,920,831 | B2 | 7/2005 | Lin | | |
| 7,044,312 | B2 | 5/2006 | Yang | | |
| 7,128,225 | B2 | 10/2006 | Saltzburg et al. | | |
| 7,252,202 | B2 | 8/2007 | Saltzburg et al. | | |
| 7,365,268 | B2 | 4/2008 | Collins et al. | | |
| D569,143 | S | 5/2008 | Liss et al. | | |
| D571,133 | S | 6/2008 | Liss et al. | | |
| D571,589 | S | 6/2008 | Liss et al. | | |
| 7,389,887 | B2 * | 6/2008 | Liang | A47B 43/00 | 211/149 |
| D572,053 | S | 7/2008 | Liss et al. | | |
| D572,054 | S | 7/2008 | Liss et al. | | |
| 7,404,533 | B1 * | 7/2008 | Kologe | A47F 5/101 | 248/220.22 |
| 7,438,268 | B2 * | 10/2008 | Kologe | A47F 5/0838 | 248/220.22 |
| 7,458,744 | B2 * | 12/2008 | Hall | A47B 57/485 | 403/187 |
| D585,680 | S | 2/2009 | Liss et al. | | |
| D585,681 | S | 2/2009 | Liss et al. | | |
| D585,682 | S | 2/2009 | Liss et al. | | |
| D587,046 | S | 2/2009 | Liss et al. | | |
| D597,353 | S | 8/2009 | Liss et al. | | |
| D597,354 | S | 8/2009 | Liss | | |
| D604,065 | S | 11/2009 | Towater et al. | | |
| D604,537 | S | 11/2009 | Liss et al. | | |
| D604,538 | S | 11/2009 | Liss et al. | | |
| 7,748,546 | B2 | 7/2010 | Konstant | | |
| 7,753,220 | B2 | 7/2010 | Konstant | | |
| 7,810,770 | B2 | 10/2010 | Treadwell | | |
| 8,172,098 | B2 | 5/2012 | Eustace et al. | | |
| 8,302,788 | B2 | 11/2012 | Vargo | | |
| 8,403,157 | B2 | 3/2013 | Kleinsasser | | |
| 8,443,992 | B2 | 5/2013 | Lawson et al. | | |
| D683,983 | S | 6/2013 | Troyner et al. | | |
| 8,695,815 | B2 * | 4/2014 | Takahashi | H05K 7/14325 | 403/231 |
| 8,695,816 | B2 | 4/2014 | Troyner et al. | | |
| 8,960,451 | B2 | 2/2015 | Florence, Jr. et al. | | |
| 9,027,767 | B2 | 5/2015 | Buckley et al. | | |

(56) References Cited

U.S. PATENT DOCUMENTS

| | | | | |
|---|---|---|---|---|
| 9,033,164 | B2 | 5/2015 | Troyner et al. | |
| 9,232,858 | B2 | 1/2016 | Scholz | |
| 9,375,102 | B2 | 6/2016 | Troyner et al. | |
| 9,386,855 | B2 | 7/2016 | Sabounjian | |
| 9,474,370 | B2 | 10/2016 | Troyner et al. | |
| 9,661,921 | B1 | 5/2017 | Tsai | |
| D800,347 | S | 10/2017 | Blick | |
| 9,924,797 | B2 | 3/2018 | Hanlon | |
| 9,993,075 | B2 | 6/2018 | Buckley et al. | |
| 9,999,303 | B2 | 6/2018 | Tan | |
| 10,149,541 | B2 | 12/2018 | Hanlon | |
| 10,182,650 | B1 * | 1/2019 | Schenker | A47B 43/00 |
| 10,292,491 | B1 * | 5/2019 | Ke | A47F 5/137 |
| 10,299,593 | B2 | 5/2019 | Bruckner et al. | |
| 10,299,594 | B2 | 5/2019 | Liss et al. | |
| 10,663,177 | B2 * | 5/2020 | Nelson | F24C 15/16 |
| 10,702,062 | B2 | 7/2020 | Lee | |
| 10,709,267 | B2 * | 7/2020 | Kologe | A47B 57/42 |
| 10,806,257 | B1 | 10/2020 | Liu | |
| 10,806,258 | B2 | 10/2020 | Hanlon | |
| 11,026,509 | B2 | 6/2021 | Walker | |
| 11,039,686 | B2 | 6/2021 | Min | |
| 11,647,833 | B2 * | 5/2023 | Hanlon | A47B 47/028 211/192 |
| 12,089,735 | B2 * | 9/2024 | Hanlon | A47F 5/10 |
| 12,239,224 | B2 * | 3/2025 | Larkins | A47B 96/068 |
| 12,268,298 | B2 * | 4/2025 | Hanlon | A47B 47/027 |
| 2004/0045921 | A1 | 3/2004 | Muller | |
| 2005/0103736 | A1 | 5/2005 | Calleja | |
| 2006/0144809 | A1 | 7/2006 | Collins et al. | |
| 2006/0163438 | A1 | 7/2006 | Wojotowicz et al. | |
| 2006/0196842 | A1 | 9/2006 | Taylor et al. | |
| 2007/0175846 | A1 | 8/2007 | Konstant | |
| 2008/0145197 | A1 | 6/2008 | Taylor et al. | |
| 2008/0173603 | A1 | 7/2008 | Dion | |
| 2008/0265728 | A1 | 10/2008 | Collins et al. | |
| 2008/0272266 | A1 | 11/2008 | Eustace et al. | |
| 2009/0277854 | A1 | 11/2009 | Eustace et al. | |
| 2011/0042336 | A1 | 2/2011 | Cheng et al. | |
| 2012/0067838 | A1 | 3/2012 | Lawson et al. | |
| 2012/0187065 | A1 | 7/2012 | Song | |
| 2012/0193314 | A1 | 8/2012 | Liao | |
| 2013/0098856 | A1 | 4/2013 | Troyner et al. | |
| 2014/0116973 | A1 | 5/2014 | Buckley et al. | |
| 2015/0090683 | A1 | 4/2015 | Sabounjian | |
| 2017/0280875 | A1 | 10/2017 | Buckley et al. | |
| 2020/0054126 | A1 | 2/2020 | Globerman | |
| 2025/0120502 | A1 * | 4/2025 | Reim | A47B 57/34 |

FOREIGN PATENT DOCUMENTS

| | | |
|---|---|---|
| DE | 202006008038 | 10/2006 |
| DE | 202012009433 | 11/2012 |
| EP | 1151695 | 11/2001 |
| EP | 808589 | 7/2003 |
| GB | 570503 | 7/1945 |
| GB | 2148100 | 5/1985 |
| GB | 2486640 | 4/2014 |
| KR | 200320245 | 7/2003 |
| KR | 20210115689 | 9/2021 |
| WO | 20053056 | 9/2000 |
| WO | 2019033287 | 2/2019 |

* cited by examiner

WORKBENCH AND RACK AND ACCESSORIES THEREFOR

RELATED APPLICATION DATA

This application claims priority to U.S. Provisional Application Ser. No. 63/340,325, filed May 10, 2022, which application is incorporated herein in its entirety by reference.

FIELD OF THE INVENTION

The present invention relates to work benches and storage racks.

BACKGROUND OF THE INVENTION

A variety of workbenches, storage racks and similar structures are known, such as for use in a garage or workshop for supporting tools and workpieces. Despite the number of such existing products, a need still exists for improvements to such products. For example, many existing products are not versatile and thus don't allow a user to customize the product, such as to their desired use.

Another problem is that these products are generally manufactured as a plurality of components and are then packaged and shipped in an unassembled configuration to the user or to a store at which the user purchases the product. There is a high costs associated with shipping and storing the products, part of which is based upon the size of the packaging. It is thus desirable to innovate new structures which perform the desired functionality in use, but which can be packed or packaged to a minimal amount of space. Also, because the end user generally must assemble the product, it is at the same time desirable that the assembly process be user-friendly.

SUMMARY OF THE INVENTION

Aspects of the invention comprise work benches and racks (which may comprise wall mounted racks or racks with elevated supported shelves or the like), such as storage and mounting racks. Additional aspects of the invention comprise features of, or accessories for, such workbenches or racks, such as frame assemblies, notched shelf beams, drawers, pegboards, decking (such as wire decking) and the like. Yet other aspects of the invention comprise methods of manufacturing, packing/shipping and assembling such workbenches and racks.

Further objects, features, and advantages of the present invention over the prior art will become apparent from the detailed description of the drawings which follows, when considered with the attached figures.

DESCRIPTION OF THE DRAWINGS

FIGS. 4A1 and 4A2 show an isometric views of a shelf beam bracket, in accordance with one non-limiting embodiment of the disclosed concept.

FIGS. 10A-1 and 10A-2 show isometric and side views, respectively, of a wire decking bracket, in accordance with one non-limiting embodiment of the disclosed concept.

FIGS. 10B-1 and 10B-2 show isometric and side views, respectively, of another wire decking bracket, in accordance with another non-limiting embodiment of the disclosed concept.

FIGS. 10C-1 and 10C-2 show isometric and side views, respectively, of another wire decking bracket, in accordance with another non-limiting embodiment of the disclosed concept.

FIGS. 10D-1 and 10D-2 show isometric and top views, respectively, of another wire decking bracket, in accordance with another non-limiting embodiment of the disclosed concept.

FIGS. 10E-1 and 10E-2 shows isometric and enlarged views, respectively, of a wire deck in accordance with one non-limiting embodiment of the disclosed concept.

FIGS. 11A-1 and 11A-2 are isometric and front views, respectively, of a pegboard, in accordance with one non-limiting embodiment of the disclosed concept.

FIGS. 11A3 and 11A-4 are views of a pegboard mounting cap in accordance with an embodiment of the disclosed concept.

FIG. 11A-5 is a front view of two workbenches with associated pegboards positioned side by side, in accordance with one non-limiting embodiment of the disclosed concept.

FIG. 12A-1 is an isometric view of a pegboard assembly, in accordance with another non-limiting embodiment of the disclosed concept.

FIG. 12A-2 is an enlarged view of the portion of the pegboard assembly illustrated in FIG. 12A-1.

FIG. 12A-3 is an isometric view of another pegboard assembly, in accordance with another non-limiting embodiment of the disclosed concept.

FIG. 12B-1 illustrates another configuration of a "Z" beam end frame or support, such as for a workbench.

FIG. 12B-2 illustrates a configuration of an end support which includes a pegboard.

FIGS. 12B-3 and 12B-4 are isometric views from opposing sides that illustrate yet another configuration of an end support which includes a pegboard.

FIGS. 13B-1 and 13B-2 illustrate isometric views of two different pegboard pegs, in accordance with another non-limiting embodiment of the disclosed concept.

FIGS. 13C-1 and 13C-2 are isometric and section views, respectively, of another pegboard peg, in accordance with another non-limiting embodiment of the disclosed concept.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

As employed herein, the term "number" shall mean one or an integer greater than one (i.e., a "plurality").

As employed herein, the term "coupled" shall mean connected together either directly or via one or more intermediate parts or components.

Aspects of the invention comprise work benches and racks, such as storage and mounting racks. Additional aspects of the invention comprise features of, or accessories for, such workbenches or racks, such as frame assemblies, notched shelf beams, drawers, pegboards, decking (such as wire decking) and the like. Yet other aspects of the invention comprise methods of manufacturing, packing/shipping and assembling such workbenches and racks.

Figure 1:
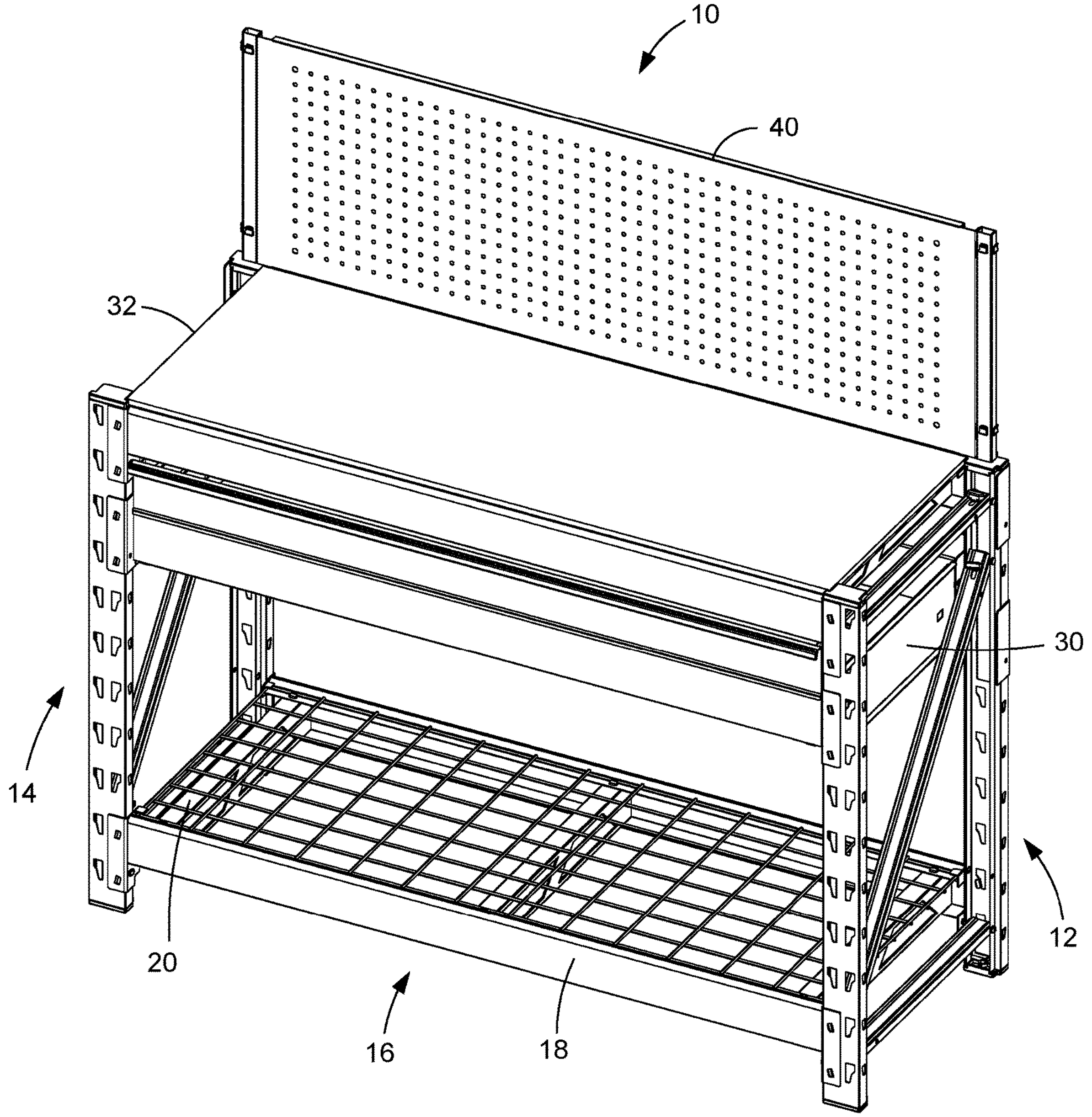
FIG. 1 is an isometric view of a workbench, in accordance with one non-limiting embodiment of the disclosed concept.

FIG. 1 illustrates a workbench 10 in accordance with the invention and to which various aspects of the invention may apply. The workbench 10 comprises a frame, such as a first and second end frame assemblies 12,14. The first and second end frame assemblies 12,14, when in use, may extend generally vertically. As detailed below, the end frame assemblies 12,14 may have a "Z" beam configuration (e.g. having two uprights and horizontal and diagonal bracing therebetween, which bracing may generally form a "Z" shape). The workbench 10 may also comprise one or more shelves or decks 16, such as supported in a raised position between the first and second frame assemblies 12,14. The shelves or decks 16 may comprise, for example, wire decking which is supported by one or more shelf beams 18 and/or one or more cross-beams 20.

The workbench 10 may further comprise one or more drawers 30. Again, the drawers 30 may be supported by and between the first and second end frame assemblies 12,14. The workbench 10 may also include a work surface 30, such as a generally planar and closed surface.

As illustrate in FIG. 1, the workbench 10 may also comprise one or more pegboards 40 or other mounting/support elements. The pegboard 40 may, for example, extend upwardly from the workbench 10 at the rear thereof above the work surface 30.

Figure 2A:
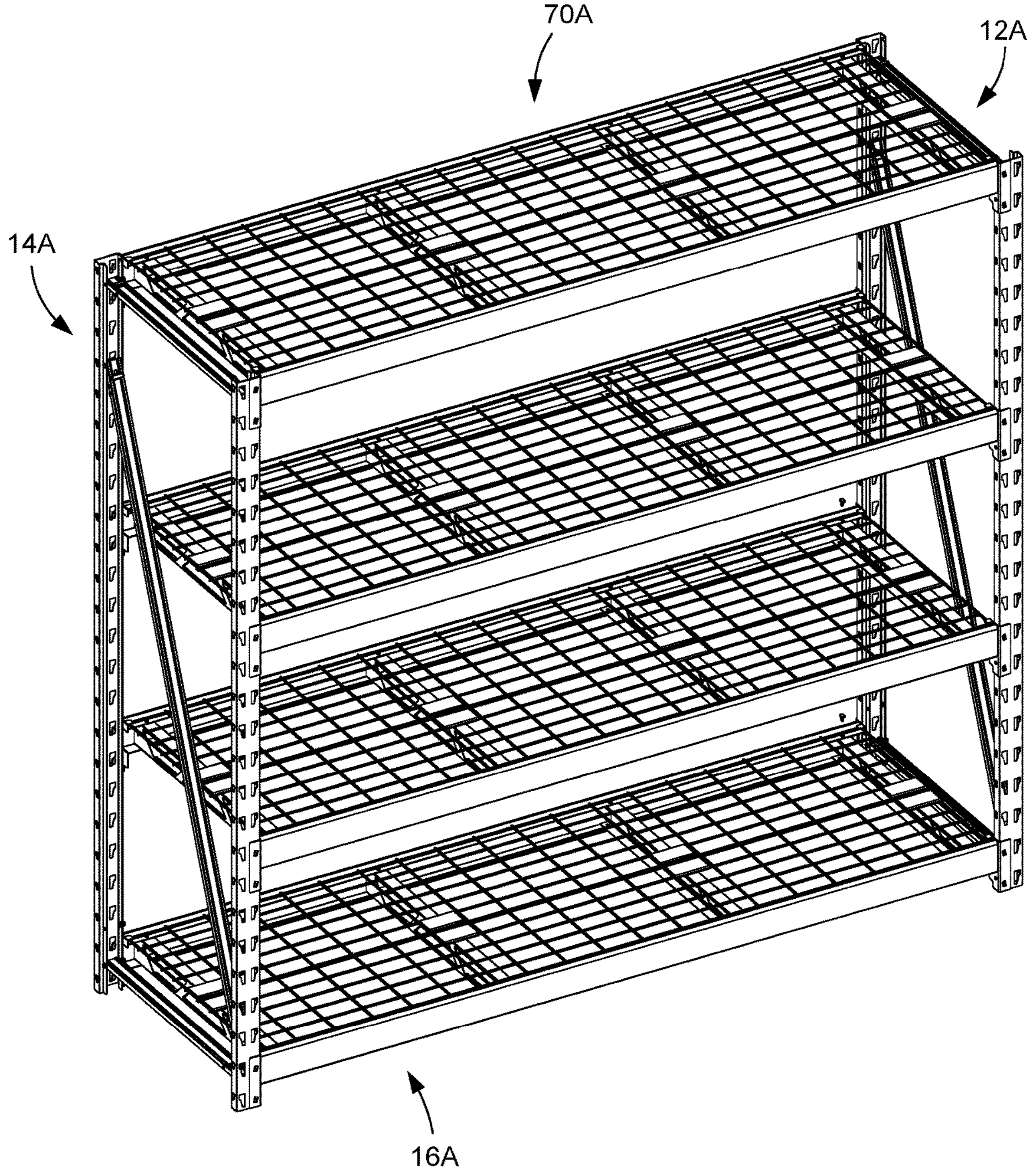
FIGS. 2A and 2B are isometric views of folding and non-folding storage racks, respectively, in accordance with non-limiting embodiments of the disclosed concept.
Figure 2B:
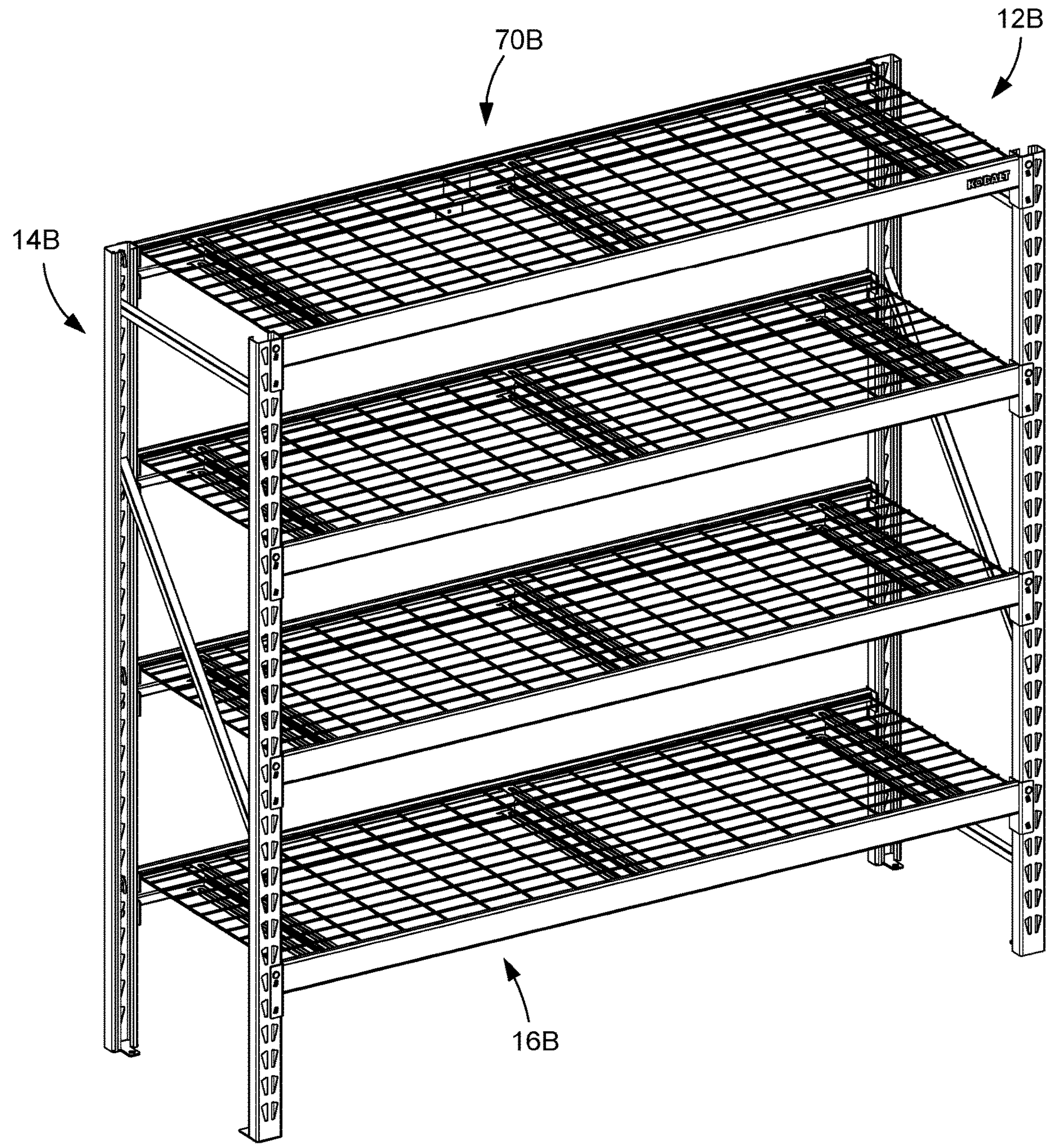

FIGS. 2A and 2B illustrate examples of storage or support racks in accordance with the invention and to which aspects of the invention apply. FIG. 2A illustrates a foldable rack 70A. The foldable rack 70A comprises a frame, such as a first and second end frame assemblies 12A,14A. Again, the first and second end frame assemblies 12A,14A may extend vertically when in use, and may have a "Z" configuration. In addition, the foldable rack 70A may have a plurality of shelves or decks 16A which are supported by and between the end frame assemblies 12A,14A. These shelves 16A may again comprise decking that is supported by shelf beams and one or more cross beams. In one embodiment, the foldable rack 70A may be disassembled, such as for shipping or storage, as described in more detail with reference to FIG. 5.

FIG. 2B illustrated a non-folding or welded rack 70B. This rack 70B may again comprise a frame which includes first and second end frame assemblies 12B,14B and one or more supported shelves or decks 16B. In one configuration, this rack 70B may be at least partially disassembled, such as to permit the shelves 16B to be disconnected from the end frame assemblies 12B,14B, for shipping/storage or the like, as described with reference to FIG. 5.

One aspect of the invention comprises a "Z" configuration of an frame. As indicated above, such as configuration may be utilized relative to the end frame assemblies of workbenches, racks, or other elements.

Figure 3A:
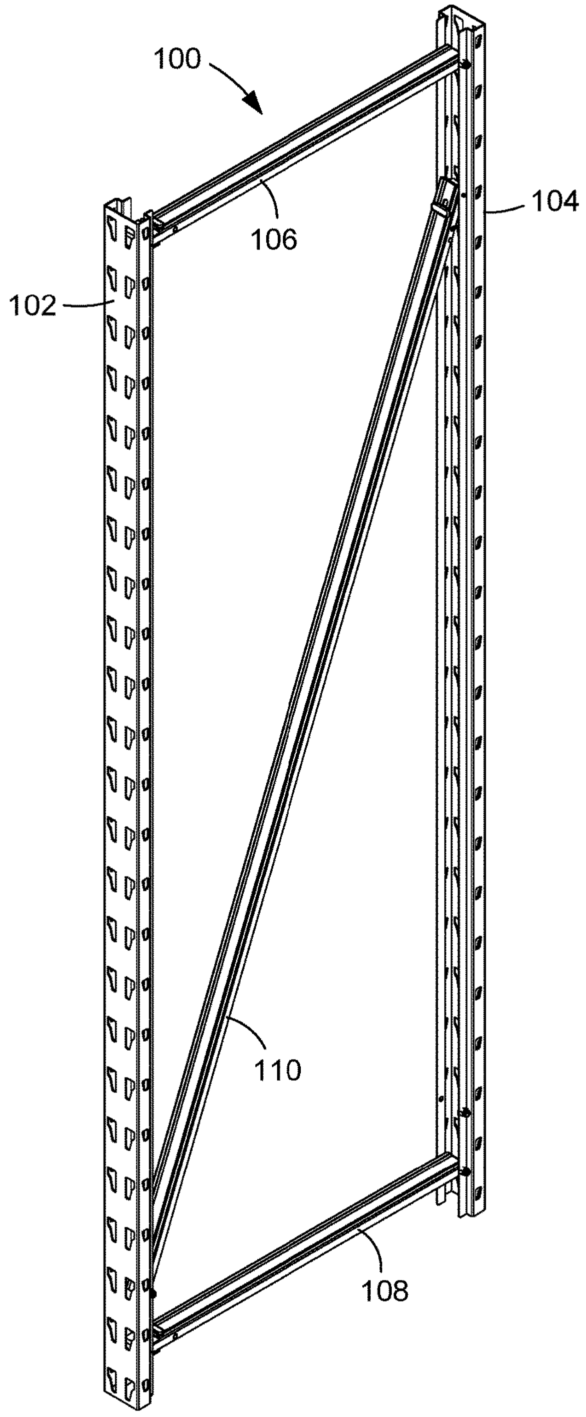
FIG. 3A shows a "Z" profile end frame or support for embodiments of the disclosed concept.

For example, FIG. 3A illustrates a "Z" profile support in an assembled configuration. The "Z" profile support 100 may comprise a first upright 102, a second upright 104, and one or more cross-members, such as a first or top horizontal cross member 106, a second or bottom horizontal cross member 108, and at least one diagonal cross member 110. The diagonal cross member 110 may be located between the top and bottom cross members 106,108.

In one embodiment, the first and second uprights 102,104 generally have a "C" shaped cross-section, thus having an exterior or front flat face and an open rear face. The first and second uprights 102,104 may define a plurality of mounts, such as openings (or alternatively, tabs) associated with the front and side faces thereof, such as for receiving mounting tabs of brackets or other elements to be connected thereto.

The cross members are preferably hingedly connected to the uprights 102,104 at the rear faces. As illustrated, the cross members may be hingedly mounted by at least one pin which passes through a mounting flange of the respective upright 102,104, and the cross-member.

In the assembled configuration, both ends of each cross member are connected (such as pinned) to the uprights 102,104. In such a configuration, the cross members form a "Z" shape.

Figure 3B:
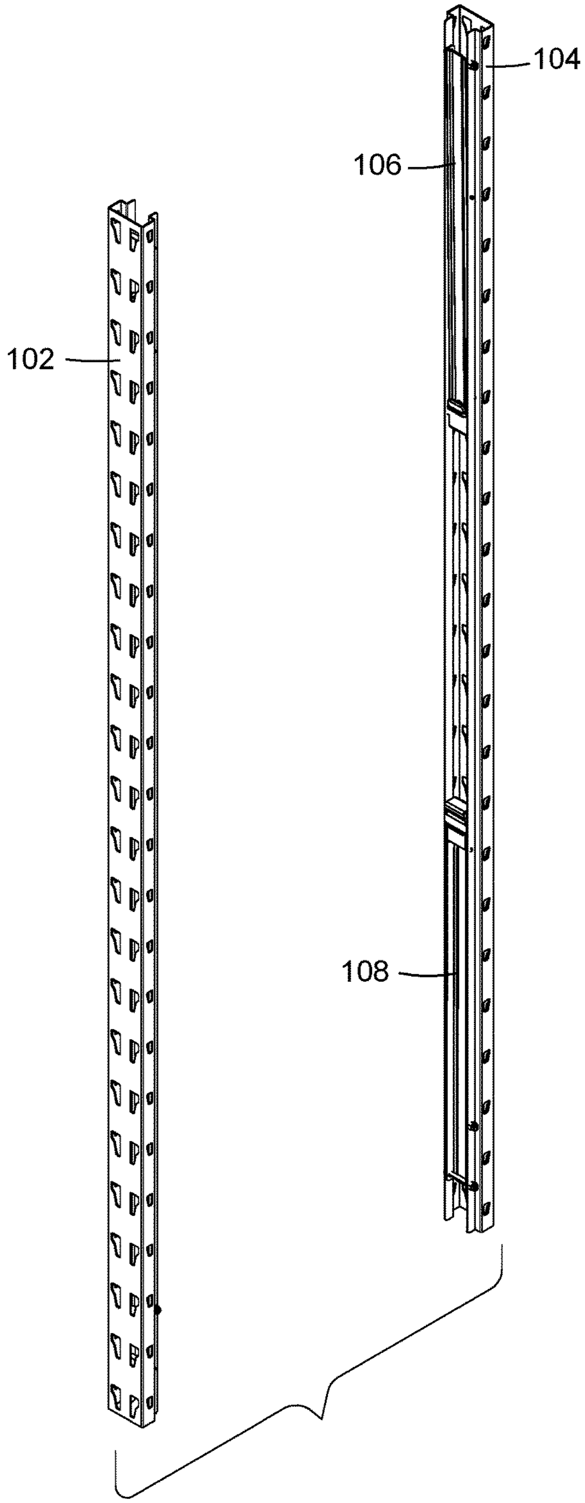
FIGS. 3B and 3C show isometric and side views, respectively, of the "Z" profile end support or frame of FIG. 3A in a collapsed configuration.
Figure 3C:
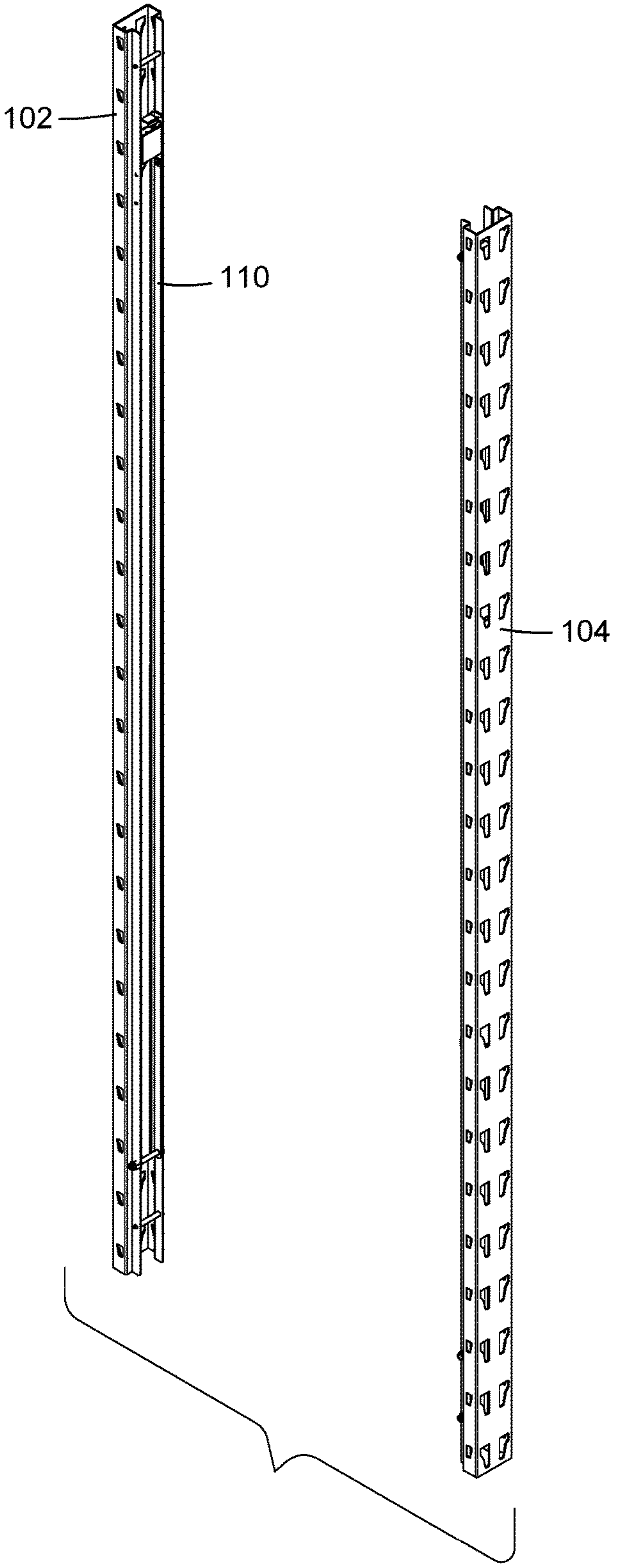

As illustrated in FIGS. 3B and 3C, the "Z" profile support 100 may be moved to a collapsed position, such as for shipping and/or storage. In such a configuration the cross-members may be folded into the uprights 102,104, whereby they are encapsulated therein. As illustrated, in FIG. 3B, in one configuration, the top cross member 106 may be disconnected from the first upright 102 and may be folded downwardly into the second upright 104 and the bottom cross member 108 may be disconnected from the first upright 102 may be folded upwardly into the second upright 106. As illustrated in FIG. 3C, the diagonal cross member 110 may be disconnected from the second upright 104 and may be folded into the first upright 102.

In this configuration, a generally flat face of each of the cross members faces outwardly from the corresponding upright 102,104, but is generally flush with or inset into the upright, thus forming a generally planar exterior surface. By having the cross members fit into the uprights 102,104 and present flat surfaces, the uprights are easier to stack, such as in packaging relative to other items, and are less likely to be damaged. This configuration contrasts with that illustrated in FIG. 2B, wherein the cross-members may be fixed to the uprights (such as by being welded thereto) and are thus not movable.

Another aspect of the invention comprise a notched shelf beam bracket 200. As illustrated in FIG. 1, a shelf beam 18 may be used to support a shelf or deck, relative to a workbench such as illustrated therein, or as illustrated in FIGS. 2A and 2B, relative to a rack.

In one configuration, the shelf beam 18 may comprise an elongate support having first and second ends. The first and second ends are preferably selectively connectable to a support, such as to one of the uprights of an end frame, such as the uprights 102,104 of the "Z" profile support 100 described above. However, the shelf beam 18 might be connected to other types of supports, such as other end frames or uprights.

In one embodiment, the shelf beam 18 is connectable to such a support via the shelf beam bracket 200, such as where a shelf beam bracket 200 is located at each end of the shelf beam.

Figures 1, 4A:
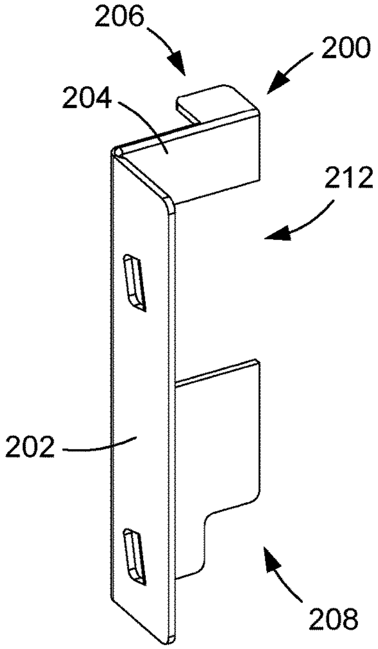
Figures 2, 4A:
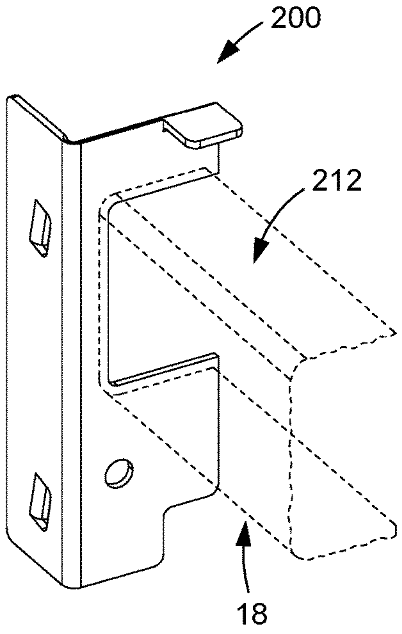

FIGS. 4A1 and 4A2 illustrate one example of a shelf beam bracket 200. This bracket 200 may be connected to the ends of a shelf beam 18, such as by welding or the like. As illustrated, the bracket 200 may be generally "L" shaped, such as having a front leg 202 and a side leg 204, such as extending generally perpendicular thereto. The bracket 200 may have a top 206 and a bottom 208.

One or more connectors may be associated with the bracket 200, such as the front leg 202. The connectors may comprise, for example, protruding tabs for engagement with mating holes in frame members (such as the uprights 102, 104 of the above-reference "Z" profile support 100).

Preferably, a notch 212 is located in the shelf beam bracket 200. The notch 212 may be located in the side leg 204. This notch 212 is preferably aligned with the open back of the shelf beam 18 and channel defined thereby. The notch 212 is preferably sized to accept a mating beam, thus allowing the shelf beams to nest inside of each other when stacked in parallel with each other reducing the amount of space for packing/shipping and reducing the likelihood of damage thereto.

Figure 5:
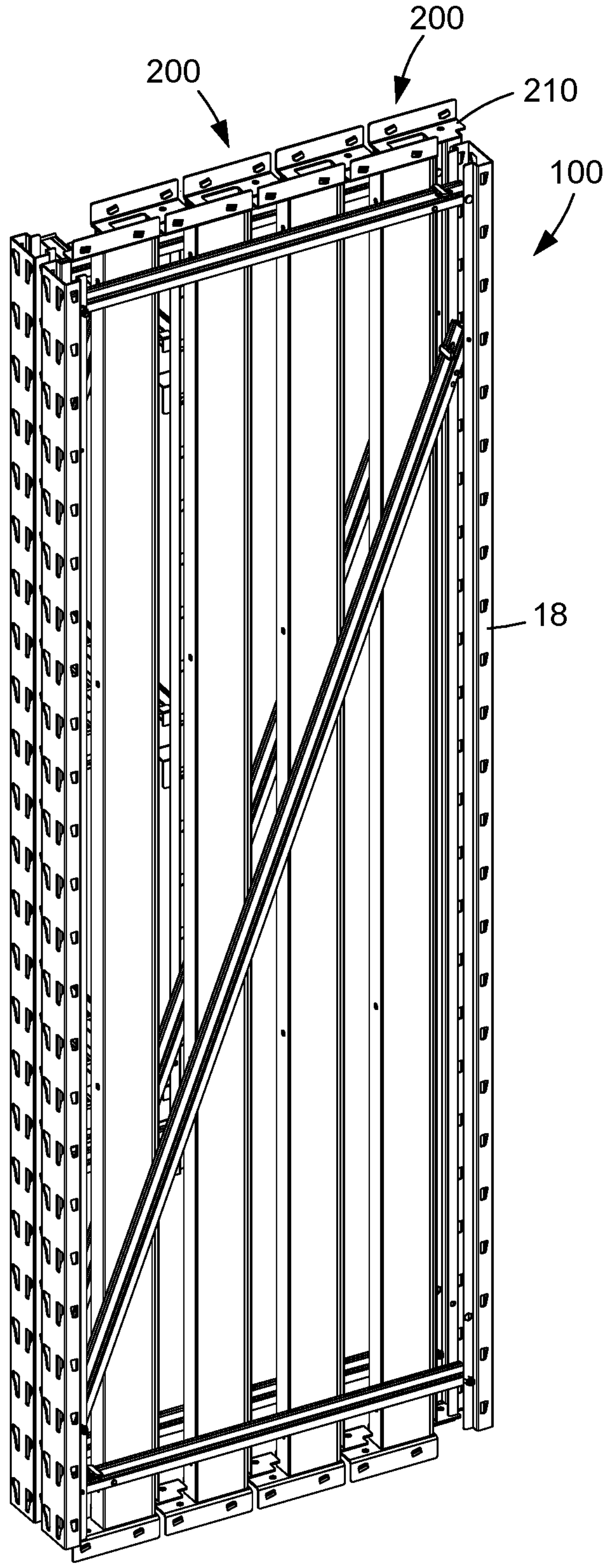
FIG. 5 shows a packaging configuration for a storage rack employing the shelf beam bracket of FIG. 2A.

FIG. 5 illustrates one preferred packing configuration for a rack of the invention. In a preferred configuration, the shelf beams 18 are all aligned parallel to one another, such as with a bottom row of four (or other number) of shelf beams 18 and then a top row of shelf beams 18 which are offset from the bottom row so that the ends thereof are at least partially nested (due to the notches on the brackets 210). In particular, the notch 212 in the shelf beam bracket 200 of one shelf beam 18 allows the protruding leg 204 of the shelf beam bracket 200 of another shelf beam 18 to be located therein, thus allowing the shelf beams 18 to essentially stack in direct contact with one another even though the brackets 200 at the ends thereof have legs 204,208 which are greater in depth dimension that than the rest of the shelf beam.

These stacked rows of shelf beams 18 may then be placed between the "Z" profile supports or frames 100, making for a smaller (in total dimension) and more stable packing and shipping configuration and preventing damage of the beams that normally occur during shipment. It is noted that in FIG. 5, the diagonal members of the "Z" profile supports or frames 100 are still connected to the uprights 102,104, but they might also be disconnected and folded, as illustrated in FIG. 3 and described above. Such a configuration is not possible with the rack illustrated in FIG. 2B where the diagonal members are not dis-connectable.

Figure 6A:
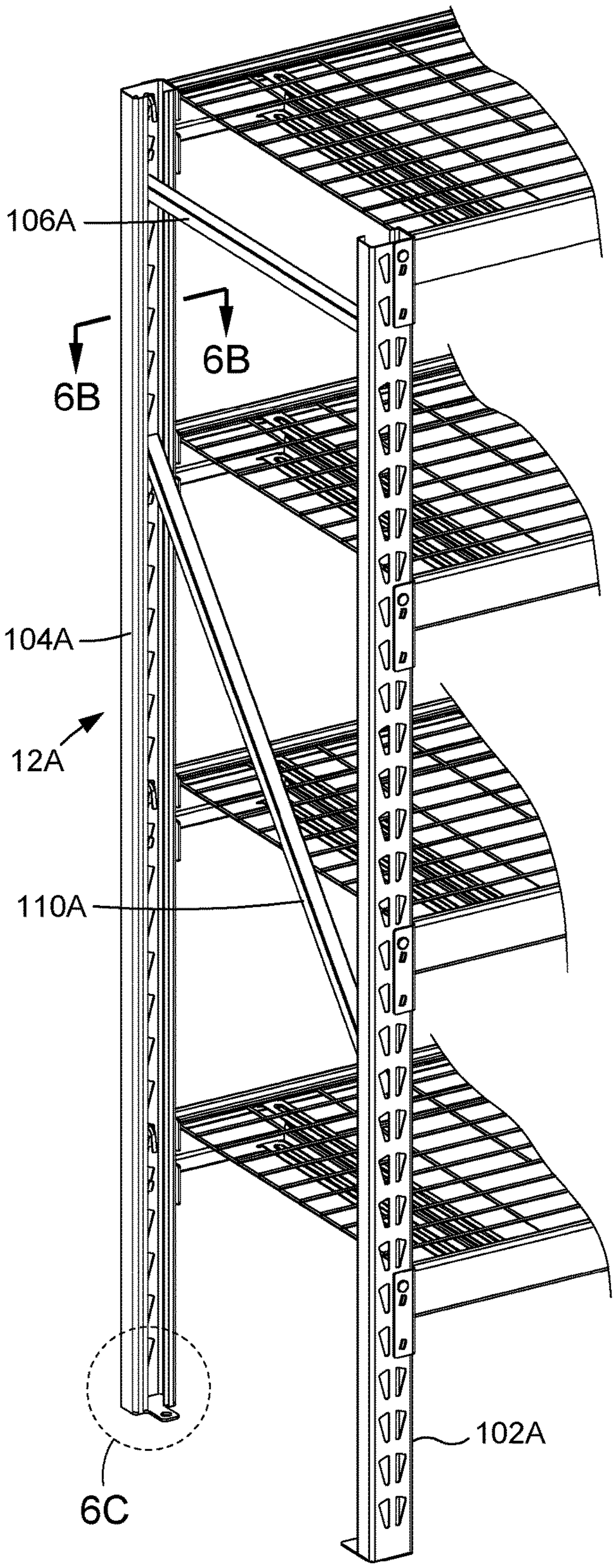
FIG. 6A shows an end view of a storage rack, in accordance with another non-limiting embodiment of the disclosed concept.

Additional aspects of the invention are illustrated in FIG. 6. These figures illustrate additional aspects of the invention in relation to the folding rack 70B briefly described above in relation to FIG. 2B, but may have other applicability. As indicated in FIG. 6A, the rack 70B may again have end supports (only one of which, 12A, is illustrated) which comprise a pair of spaced uprights 102A,104A and a plurality of cross members 106A, 110A. These members may be generally permanently connected (e.g. are not intended to be disconnected once assembled), such as by welding or the like. In this configuration, only a single horizontal cross member 106A is utilized, such as near a top of the rack, although in other configurations, other horizontal cross-members might be used, such as near the bottom of the rack. However, the rack 70B may still be generally packed for shipping in the manner described and illustrated above.

Figure 6B:
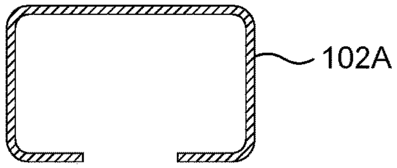
FIG. 6B shows a view of a cross-beam for the storage rack of FIG. 6A.

As illustrated in FIG. 6B, in this configuration, the uprights 102A,104A may have a generally closed "C"-shaped cross sectional shape. Faces of the uprights 102A, 104A may, as illustrated in FIG. 6A, define a plurality of mounting holes for accepting the mounting brackets 210 for the shelf beams.

Figure 6C:
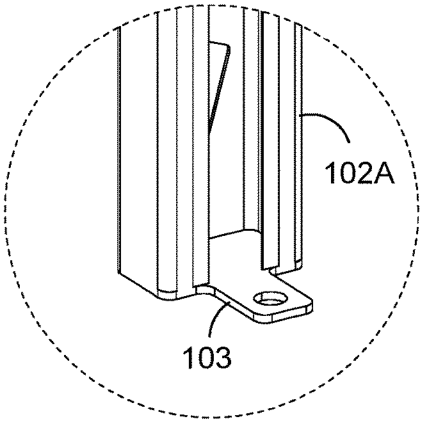
FIG. 6C shows an enlarged view of a port of an upright for the storage rack of FIG. 6A.

FIG. 6C illustrates a foot 103 which may be located at the bottom of the end frame uprights, such as upright 102A, to provide stability to the assembled rack when placed on a support surface. The foot 103 may include one or more apertures, such as for accepting a fastener therethrough for connecting the rack to the support surface. Such an aperture may pass through an outwardly extending tab portion of the foot 103.

As indicated, aspects of the invention comprise improved configurations for racks, workbenches and the like, such as facilitating minimization of unassembled size, such as for packaging, storage and shipping. Further, aspects of the invention comprise methods of configuration elements of racks, workbenches and the like, such as for packaging, storage and shipping.

Yet another aspect of the invention comprises a drawer element, such as for a workbench, rack or the like. For example, as indicated above relative to FIG. 1, at least one drawer 30 may be associated with a workbench 10 (but also might be associated with a rack, such as rack illustrated in FIG. 2A).

Figure 7:
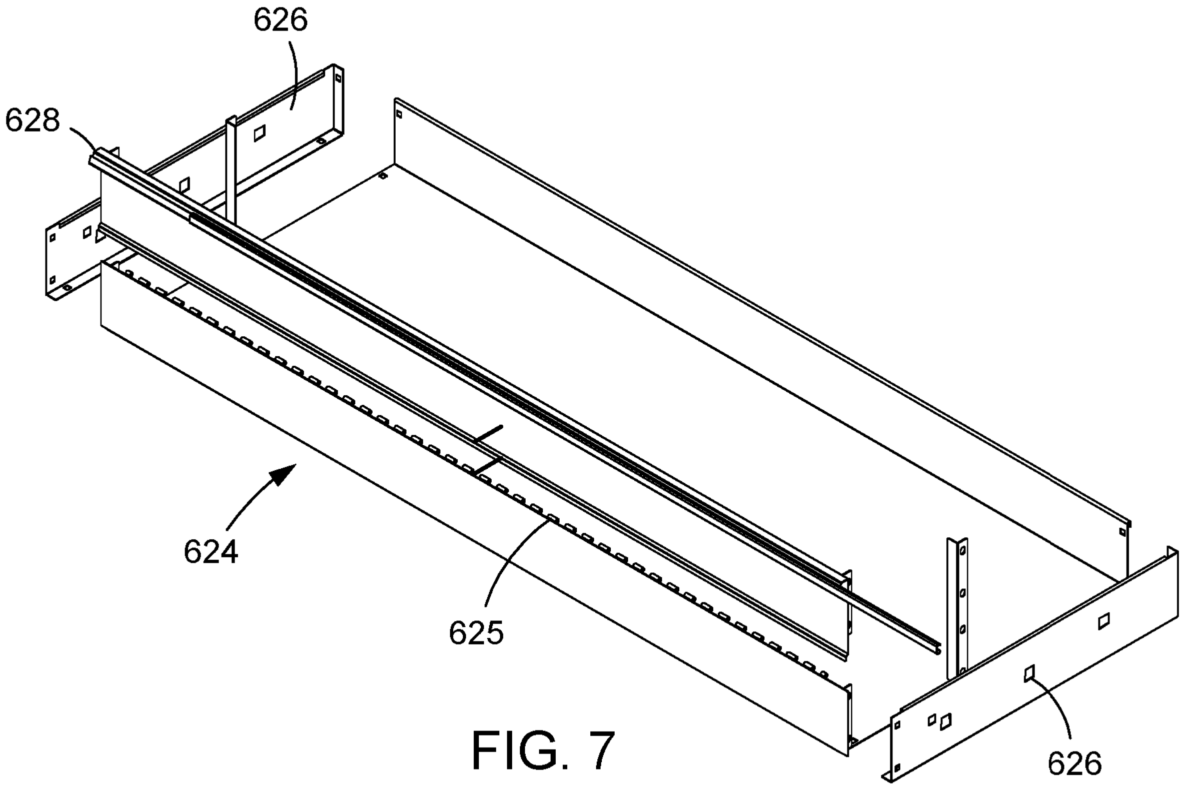
FIGS. 7 and 8 show isometric views of a drawer, in accordance with one non-limiting embodiment of the disclosed concept.
Figure 8:
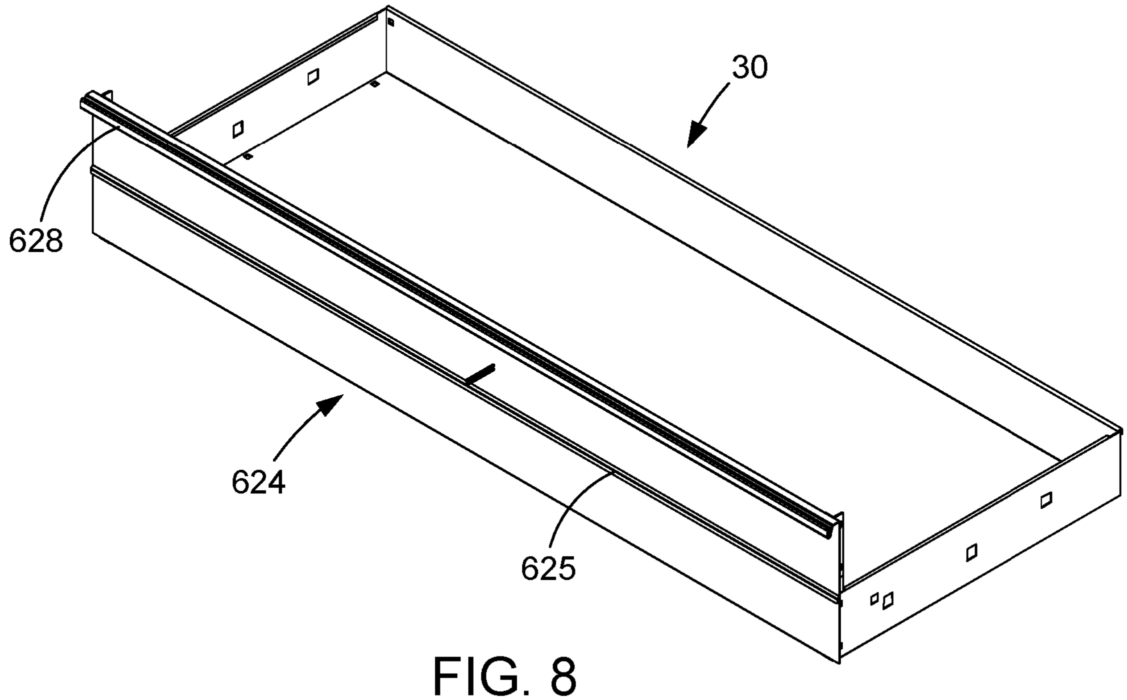

FIGS. 7-8 illustrate a drawer 30 in accordance with one embodiment of the invention. As illustrated, the drawer 30 may have a bottom and a generally "U" shaped wall, comprising a ½ folding front panel 624 and removable sides 626. The folding front panel may specifically comprise a front drawer pull panel 624. The front panel 624 may be foldable about a hinge 625, thus allowing it to be shipped more easily and at the same time allowing it to be erected by the customer, making for a larger front panel. In one configuration, the hinge can fold inward and outward depending on the pack out process, either way it helps to protect the front panel 624 from damage during shipment. The height of the foldable portion of the drawer 30 is approximately twice the height of the body side panels 626 (e.g. a 2-inch-deep drawer would have a 4 inch overall front drawer panel height). The front panel 624 in the case shown has a bent flange 628 that receives an extrusion that is used for a drawer pull, however this extrusion is not needed, and a simple flange can be applied to the edge that is also protected by the folding of the front panel. The front panel 624 may be erected and held in place (in its expanded/upright position) using an angle iron type bracket that attached to the drawer front and side panels using bolts or other fasteners. The assembly bolts can be carriage style bolts or panel nuts for ease of assembly.

Figure 9:
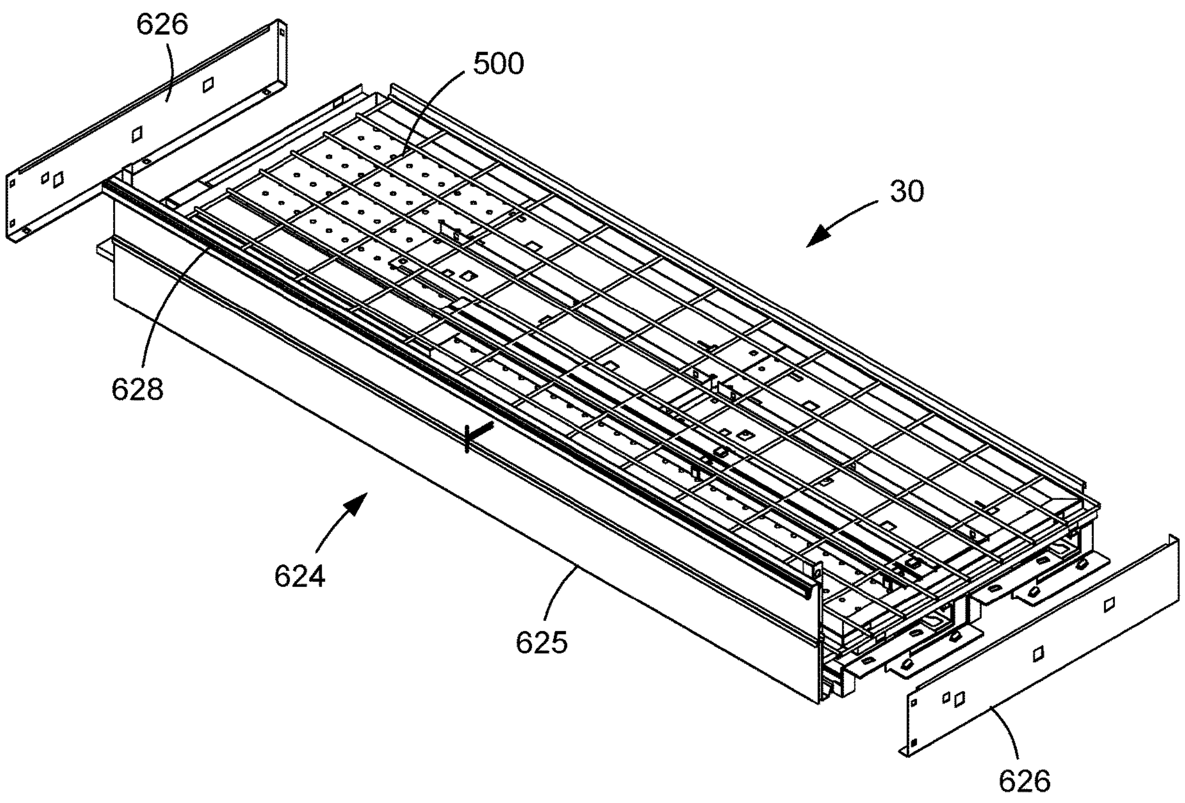
FIG. 9 shows the drawer of FIGS. 7 and 8, in a disassembled configuration for packing with portions of a rack or bench of the concept.

The sides 626 of the drawer 30 are preferably removable, such as to allow an associated frame of a rack or workbench, or other features thereof (such as shelf decking, etc.) to be packed inside of thereof, such as illustrated in FIG. 9. As shown in FIG. 9, the drawer 30 is shown as employed with portions of an example workbench 500 in a collapsed/unassembled position. The workbench 500 may be comprised of a plurality of components as described elsewhere herein, wherein various of the components, in a disassembled state, is configured to entirely fit within the drawer 30 (wherein for example, shelf wire decking, and other features may be located on top of a bottom of the drawer 30, behind the front panel 624, and between the removable sides 626). This may be considered to be a storage or shipping position of workbench 500, wherein each of its constituent components is disposed between the body side panels 626, and on one side of the hinge 625. It will be appreciated that this provides advantages in terms of shipping as well as storing of components.

Referring again to FIG. 8, the "U" shaped main body of the drawer allows most of the body to be made from a single piece of sheet metal which helps to lower cost and makes it easier to assemble by the customer. The height of the "U" shaped body is driven primarily by the height of the components that are packed inside. If the overall frame/body of the rack only has a height of 2 inches, the height of the side panels 626 would preferably match for optimal packing. By having the heights of the side panel the same height as the contents inside, the overall structure is protected during the shipping process. The "U" shaped body can have additional formed indents/ribs added to the bottom and back and front panels to provide additional strength without having to increase the gauge of the material. The "U" shaped body can be made from plastic as well using injection type process or vacuumed formed.

In the case shown, the frame of the rack/components that are packed inside are longer than the drawer's overall width. If the frame of the device is NOT as wide as the drawer all the components can be shipped inside of the drawer which would function as a "box" and be shipped more easily and help to reduce the box cost because the substrate of the box would be a steel frame/U-shaped channel made of sheet metal or plastic. The side panels would still be removable to again allow the strength of the drawer to be changed based on the gauge of material that attaches the drawer slides to the frame of the cabinet or rack. There are square holes applied to the side panels that allow drawer slides to attached to the frame/sides of the main body.

The side panels 626 may be connected to the main body of the drawer 30 by fasteners, such as a carriage bolt, to allow the user to easily assemble the drawer housing without the use of multiple tools. There is another fastener that can be used as well, such as a pen nut, or rivet nut, or simple dop din with the appropriate flanges attached to the body. The end panels have a bent lip that engages the "U" shaped body and can be made of a heavier gauge material to allow better support for the overall drawer and allow the drawer slides to be attached to it and the main frame of the rack or cabinet housing.

Because of the nature of the design, the main body of the drawer 30 can also be formed using a vacuumed forming process as well. The plastic nature of the vacuum forming helps to prevent damage during shipment. With vacuum forming, there is an optimal draft applied to the part that has a minimum of a 3-degree draft to allow the plastic to be released from the mold. By adding this draft, the main body, (be it an entire drawer or simply the "U"-shape) to nest inside other drawers and reduce the overall height of the shipping box (wherein the stacking height would advantageously only be equal to the thickness of the plastic material). An edge can be applied to the vacuum form as well that will house the drawer slides when applied to the main frame/housing/rack. The internal detents can be added to the bottom and sides of the vacuum formed body to give the body more rigidity without the need for additional manufacturing processes. Steel tubes and/or wires can be applied to the indents at the bottom and/or side as well if the thickness of the plastic material and/or overall width of the drawer exceeds the maximum allowable strength created by using ONLY indents molded into the body.

An additional feature of the drawer 30 wherein drawer slides are applied to the sides, is that the entire drawer can be lifted out should the end user want to take the tools and or supplies to a different location. In the medical field full sets of implements are removed and restocked for each procedure. A removable tray would ensure the tools are sterile. Fluid retention is a key feature when a fully molded tray bottom/drawer is used. Leaking oil, paint, cleaners and so on can and are a problem that the current sheet metal drawers do not address.

As one aspect of the invention, the workbench can be packaged in a similar manner to the rack described above, wherein the shelf beams are offset and stacked in rows, the associated end frames are located at the top and/or bottom of the shelf beams, any shelf racks are also stacked thereon, and the entire assembly is then associated with the disassembled drawer, in the manner illustrated in FIG. 9 (there the drawer ends may then be placed at each end of the packaged stack, thus protecting the ends of the elements of the workbench).

As indicated above, in some embodiments, a workbench, rack or the like may have a shelf deck 16, wherein the shelf deck may comprise a wire deck. As one aspect of the invention, two or more wire decks may be utilized, wherein advantages are realized by joining the wire decks. In particular, in one embodiment, such as illustrated in FIG. 10E1, a wire deck such as that illustrated relative to the workbench 100 in FIG. 1 may comprise a first wire deck portion 16A and a second wire deck portion 16A. In the illustrated configuration, the wire deck 16 is essentially split down the middle in a lengthwise direction, but it might comprise separate end portions rather than front and rear portions.

The wire deck portions 16A,B might, for example, be separate elements or might be hinged. In either case, this allows the width of the wire deck 16 to be reduced, such as for packing (such as by stacking the two portions 16A,16B or folding them on top of one another). A problem, however, is that the wire deck portions 16A,B may either tend to buckle during use, or may move apart from one another.

Figures 1, 10A:
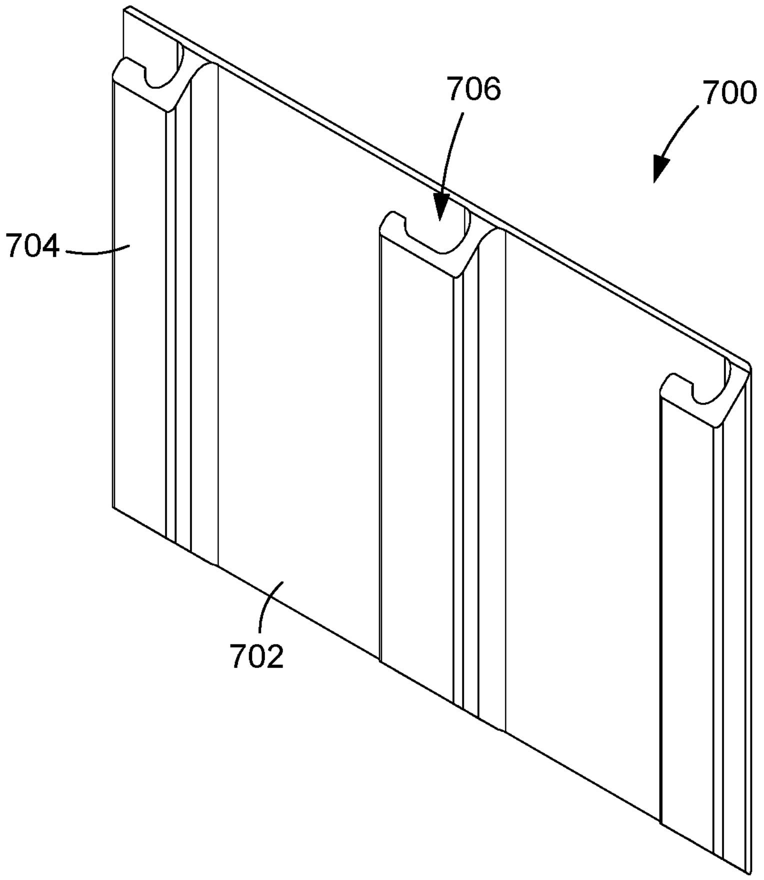
Figures 2, 10A:
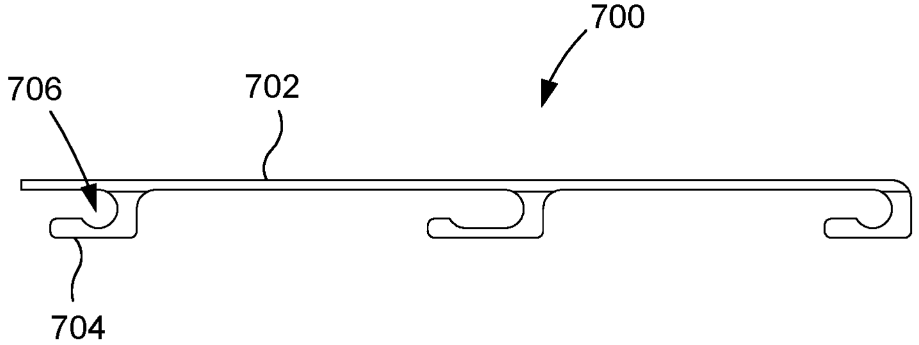

As illustrated in FIGS. 10A1 and 10A2, the wire decking bracket 700 may comprise a base plate 702 and spaced fingers or tabs 704. The fingers 704 may be generally C or L shaped, extending from the plate 702 and defining, either alone or in combination with the plate 702, a slot 706 for accepting one of the wires of the wire deck portions. In general, the fingers 704 are preferably at least slightly biased to a position which reduces the dimension of the slots 706, so that corresponding wires must be pressed into the slots 706 by applying a force that opens the fingers 704. In one embodiment, the fingers 704 are spaced apart so that different fingers 704 engage different wires of the wire deck portions, such as illustrated in FIG. 10E-2.

Figures 1, 10B:
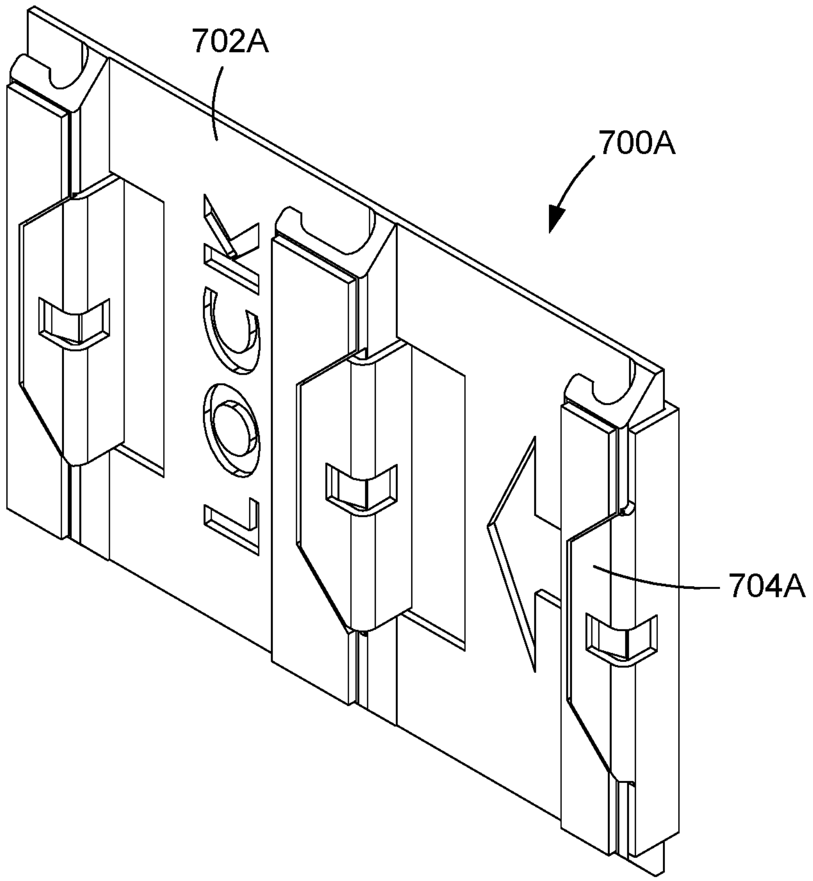
Figures 2, 10B:
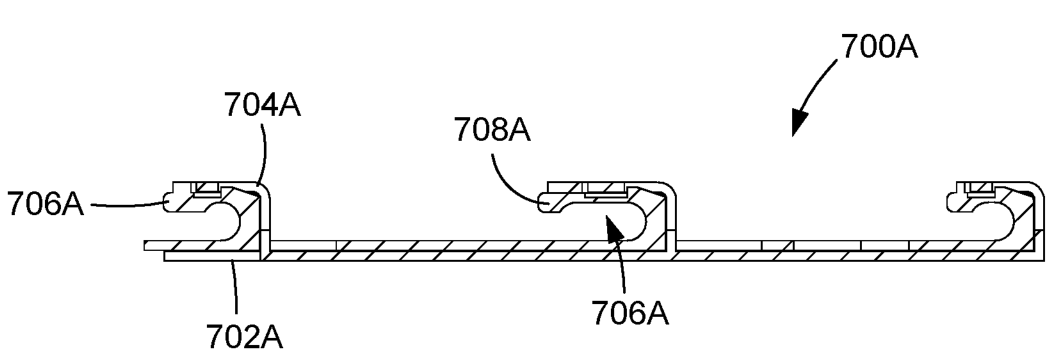

FIGS. 10B1 and 10B-2 illustrate another configuration of a decking bracket 700A. In this configuration, the bracket 700A may again comprise a base plate 702A and fingers or tabs 704A. In this case, the base plate and tabs might be constructed of metal to be durable (and not crack or break under load). However, the decking bracket 700A may further include inserts 708A. These inserts may comprise a durable and more pliable material, such as plastic, and may have a generally flat base portion which corresponds to the base plate 702A and then a tab portion which fits into the tabs 704A and defines a slot or opening 706A for the decking.

Figures 1, 10C:
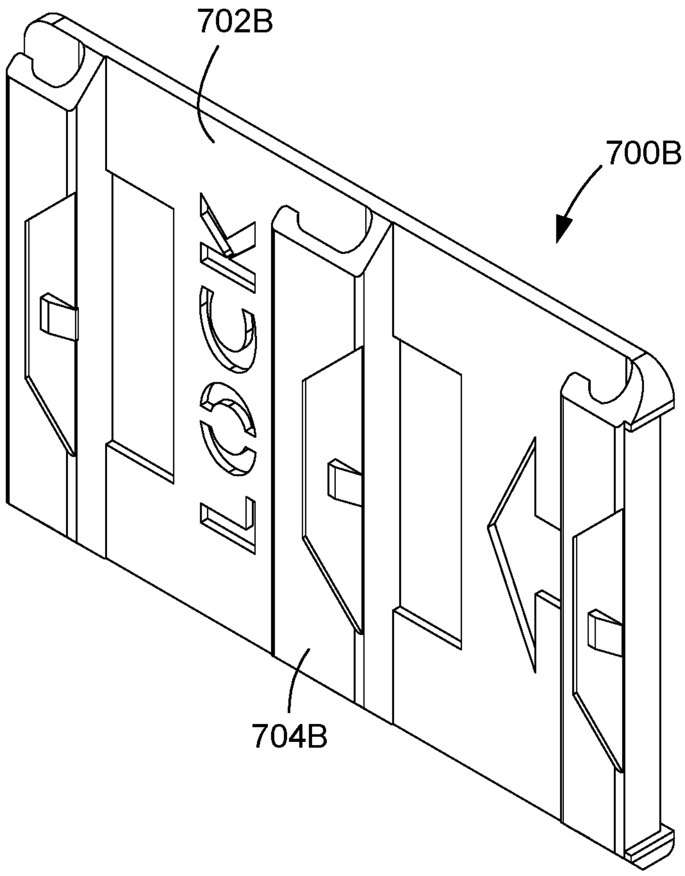
Figures 2, 10C:
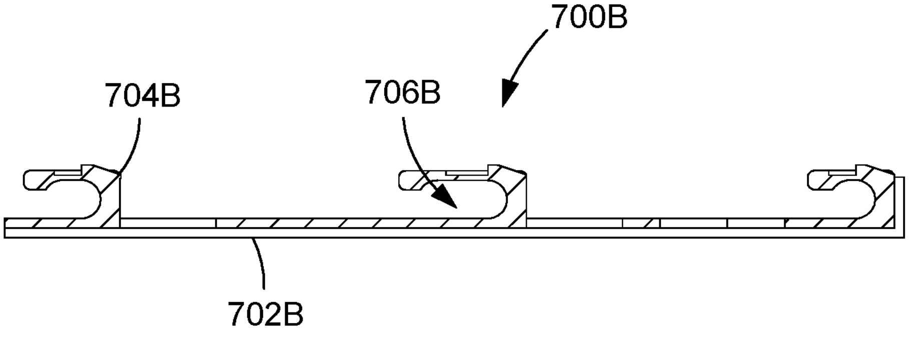

FIGS. 10C-1 and 10C-2 illustrate another embodiment decking bracket 700B which again comprises a base portion 702B, such as which may be constructed from metal. One or more inserts or overlays may be connected thereto which define spaced tabs 704B which define slots or openings 706B for the decking.

Figures 1, 10D:
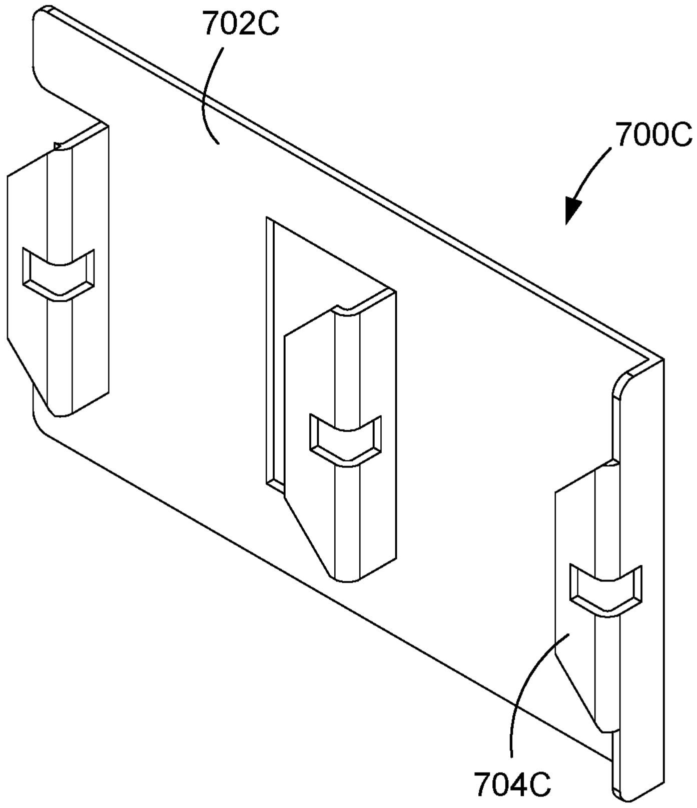
Figures 2, 10D:
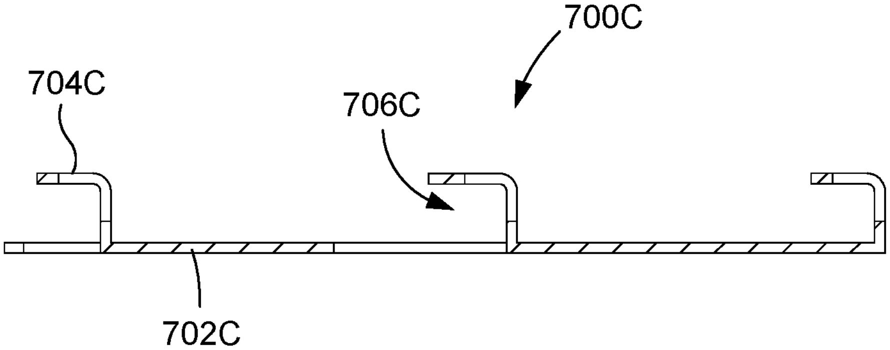
Figures 1, 10E:
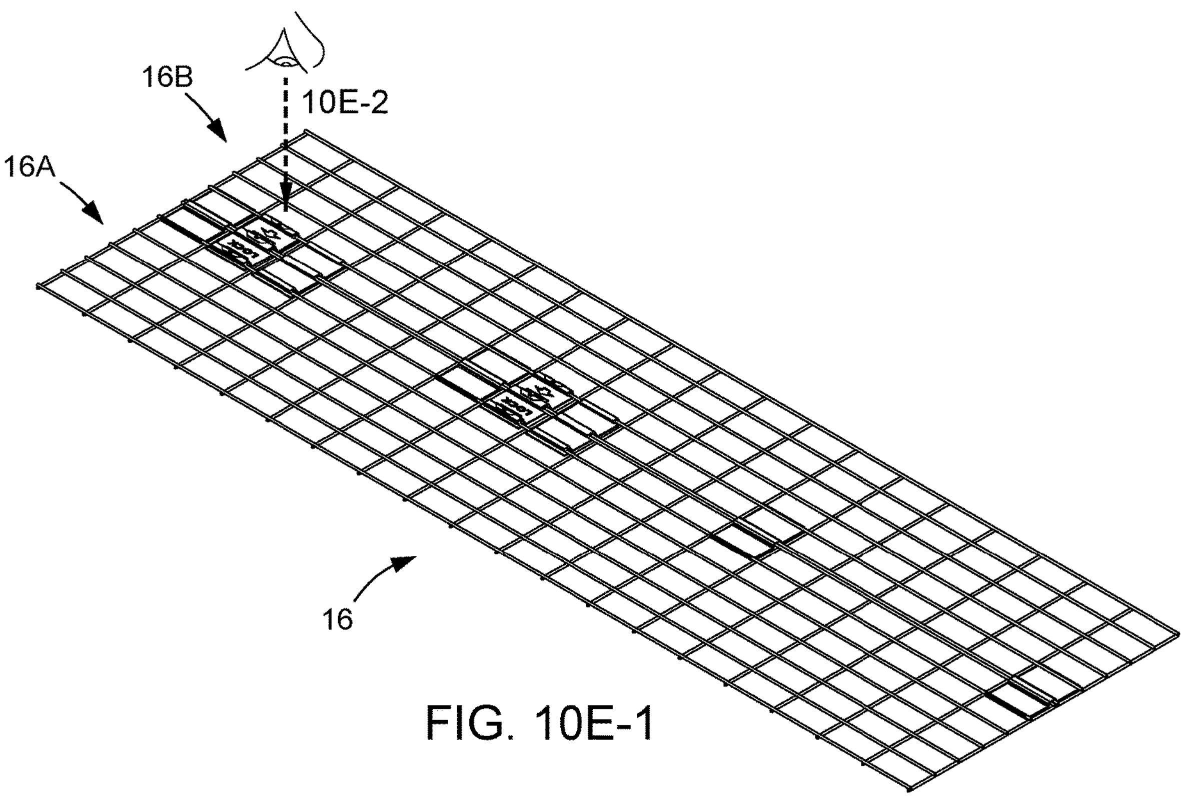
Figures 2, 10E:
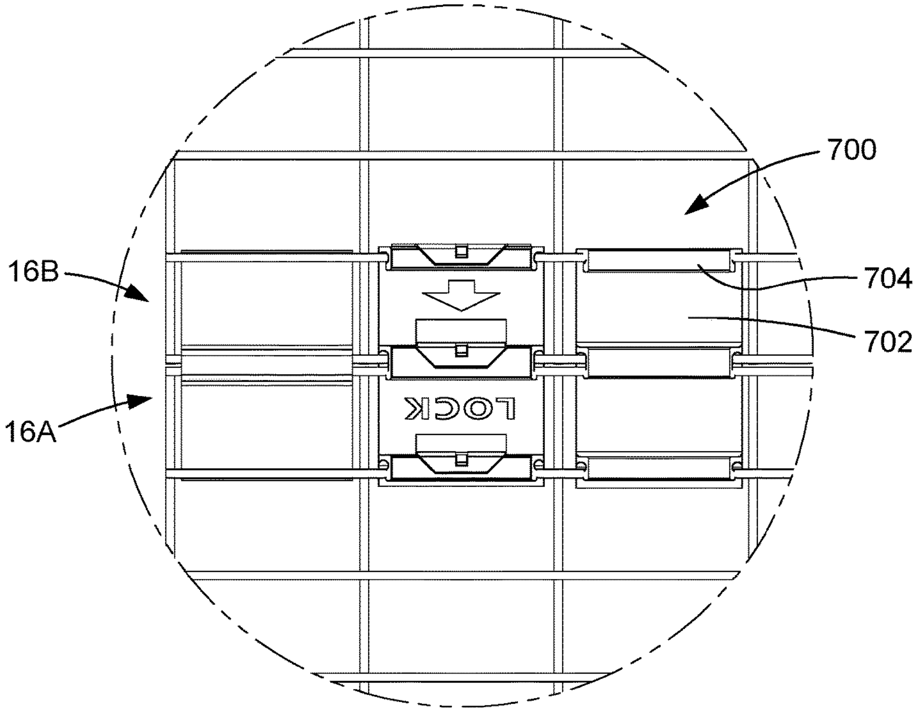

FIGS. 10D-1 and 10D-2 illustrate yet another embodiment decking bracket 700C which might comprise a base plate 702C and a plurality of spaced fingers or tabs 704C, such as which define slots or openings 706C between them and the base plate 702C for accepting portion of the decking.

In general, the bracket 700,700A,700B,700C allows for a different attachment method of at least two portions of a wire deck 16, thus keeping them connected. Further, the plate/rigid configuration thereof keeps the portions of the deck 16A,16B from bending or buckling at a hinge point. As indicated, the bracket may be made of plastic and/or a plastic and metal combination. The choice of material may depend upon the size of the wire deck portions to be joined, and thus the required rigidity/strength thereof. For example, smaller wire decks might only require a plastic bracket, while larger wire decks might require metal reinforcement, such as by making at the plate of metal.

In use, as illustrated in FIGS. 10E1 and 10E2, the user unfolds and/or aligns the wire deck portions 16A,16B to be joined. The user then places the bracket 700 (or variations thereof) so that it spans the joint between the two wire deck portions and then pushes the bracket 700 into engagement with wires of the two wire deck portions, wherein the wires are pushed into the slots 706 and thus snapped or retained by the fingers 704.

In one embodiment, the decking bracket may be configured to have three tabs. One tab may engage a wire of the first wire deck portion 16A, an opposing tab may engage the second wire deck portion 16B, and the central tab may engage the adjacent wires of both the wire deck portions. This central tab may, as illustrated, be longer in dimension so as to define a slot which is sufficiently long to engage both deck portions. Of course, the bracket might include other numbers of tabs (such as 5, etc.) and may have various widths.

As indicated above, by having the wire deck 16 comprise two or more separate or stackable parts or portions 16A,16B, the packing dimension of an associated workbench or rack may be reduced, such as by approximately 1.5" (equal to the width of a shelf beam; 4 shelf unit vs. a 3 shelf unit option). Further, the wire decking components can be made to a universal depth, whereas in conventional racks they must be asymmetrical to allow the welded plate to be applied to one side. The bracket 700 acts as a locking system and is made in such a way to allow the wire deck portions 16A,16B to be connected without the need for any additional fasteners by merely slide-locking the bracket.

One aspect of the invention comprises accessories or features for a workbench or rack. One accessory in accordance with the invention is a pegboard or similar mounting board. For example, FIG. 1 illustrates an example of a pegboard 40 as associated with a workbench 10. Of course, the pegboard 40 might be used with other benches, racks or the like.

Figures 1, 11A:
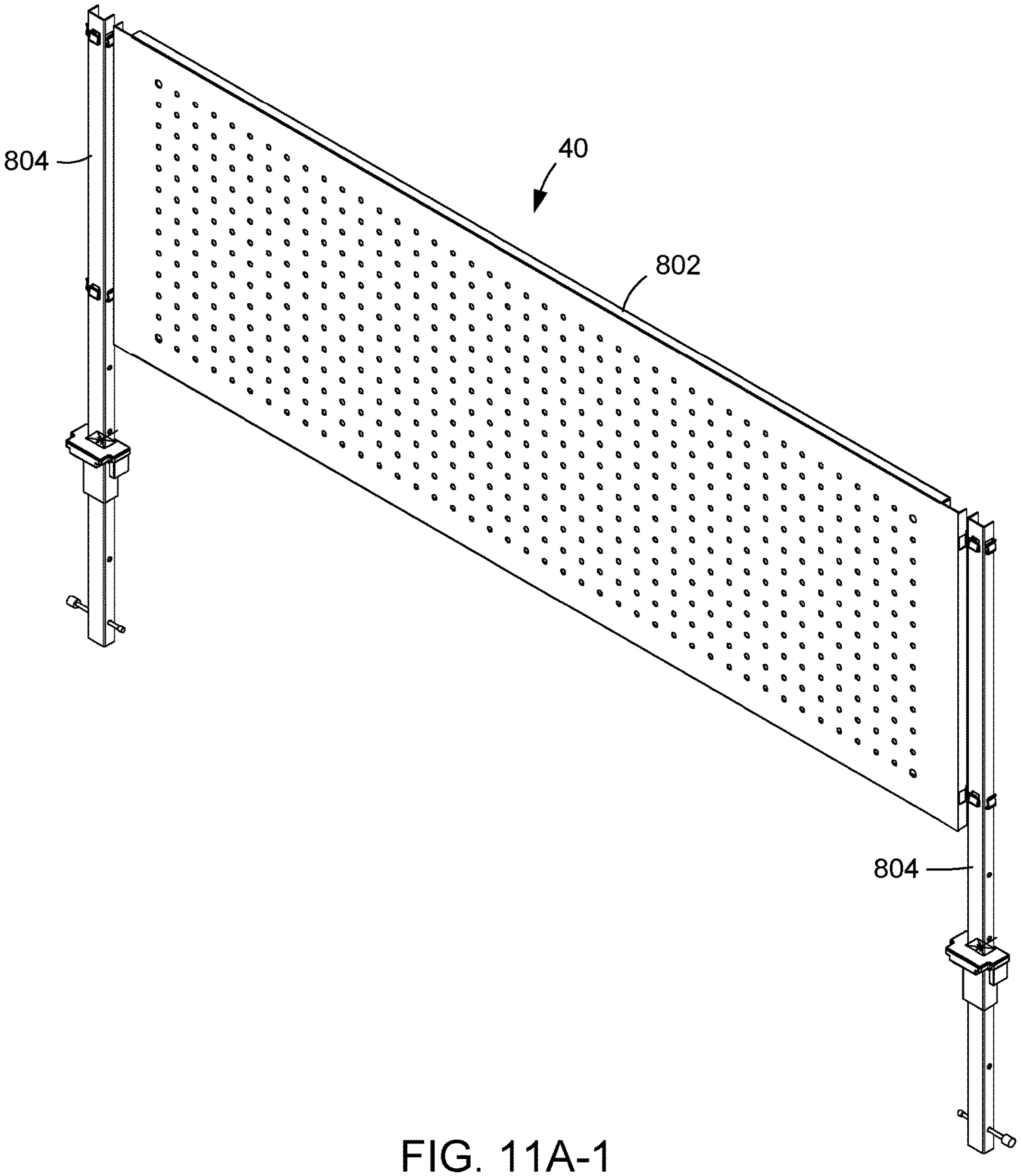
Figures 2, 11A:
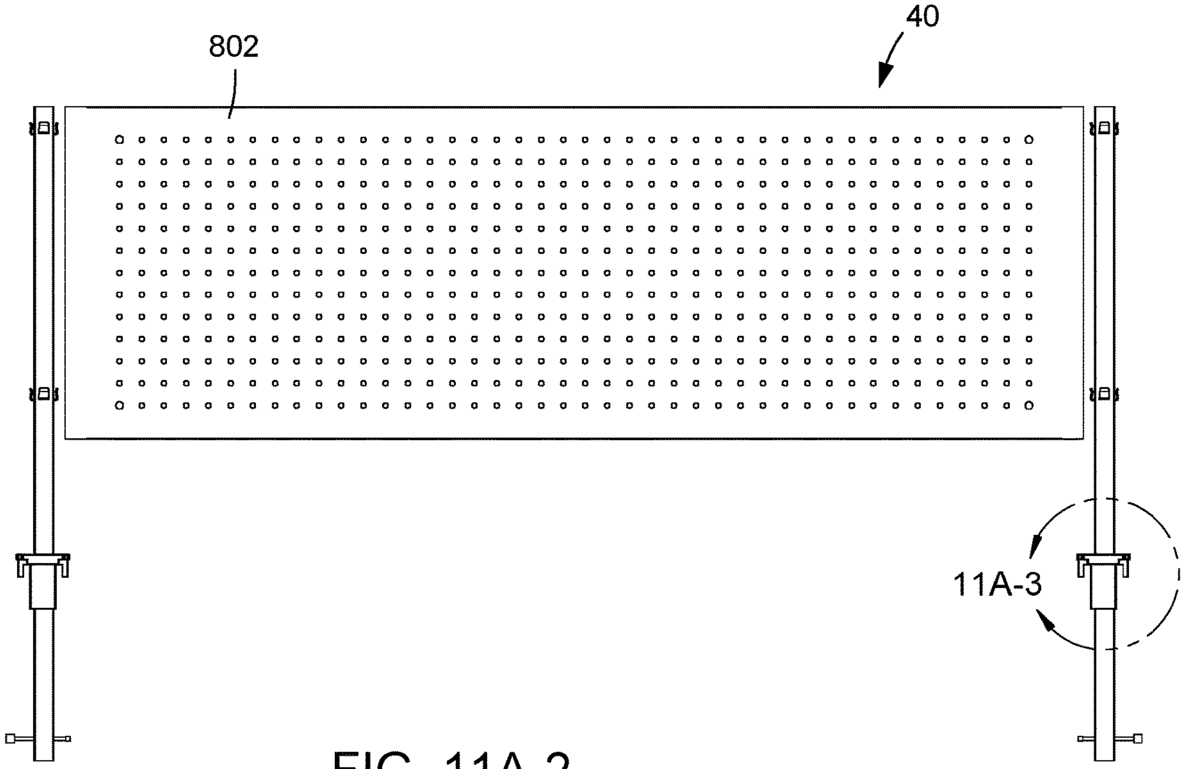
Figures 3, 11A:
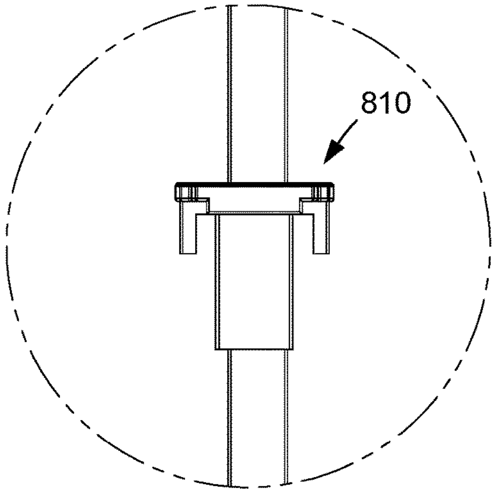
Figures 4, 11A:
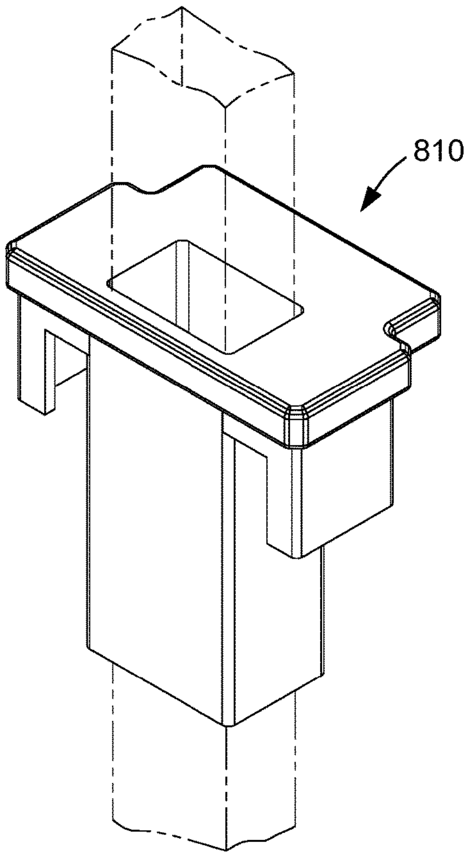
Figures 5, 11A:
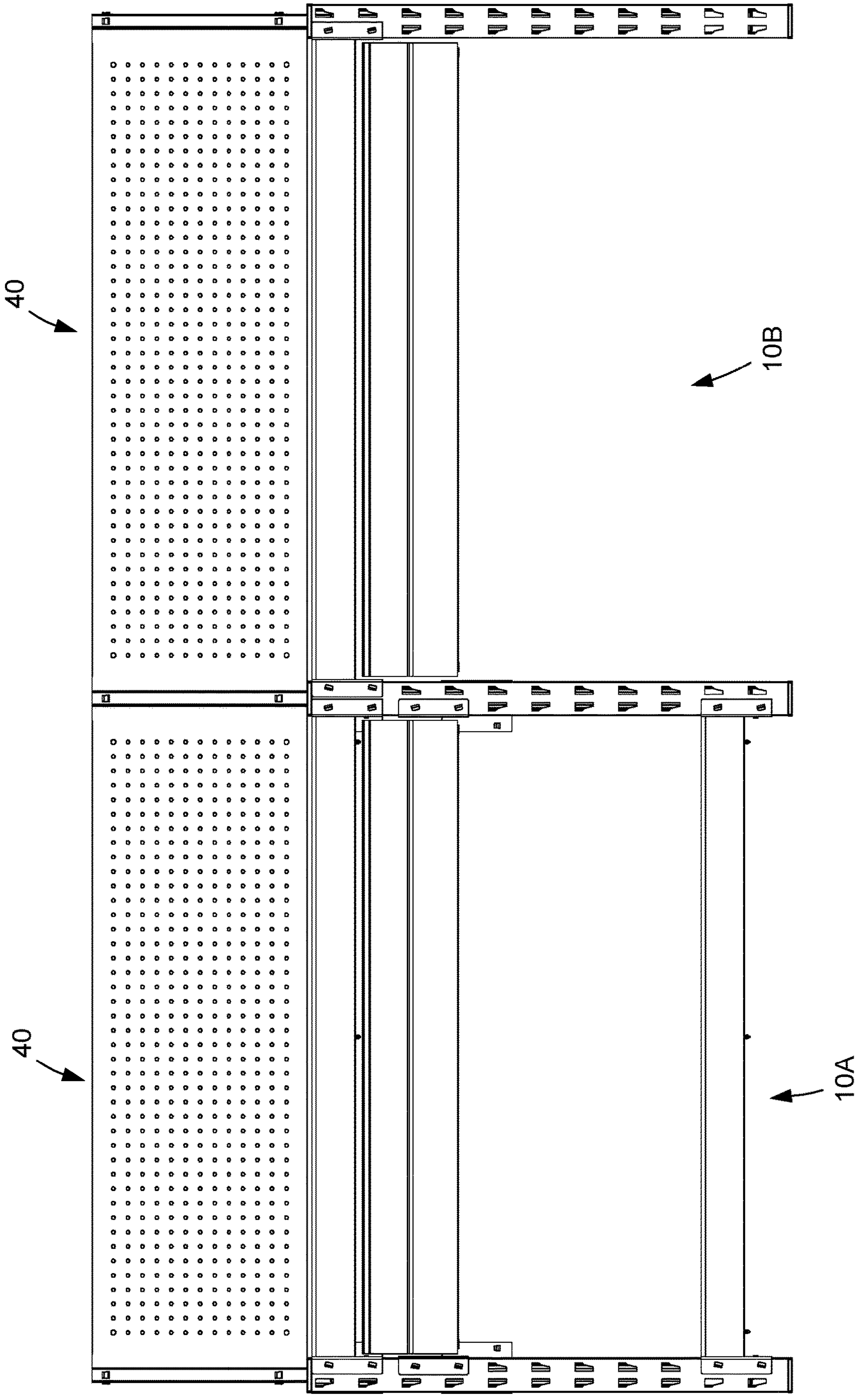

As illustrated in FIG. 11A-1, the pegboard 40 may have a main body 802, such as comprising a generally planar body having a plurality of mounting apertures formed therethrough from a front to a rear thereof. The size and shape of the body 802 may be varied, as may the pattern of apertures and their sizes. As illustrated in FIGS. 11A-1 and 11A-2, the pegboard body 802 may be supported by one or more posts 804, such as a post at each end.

Figure 11B:
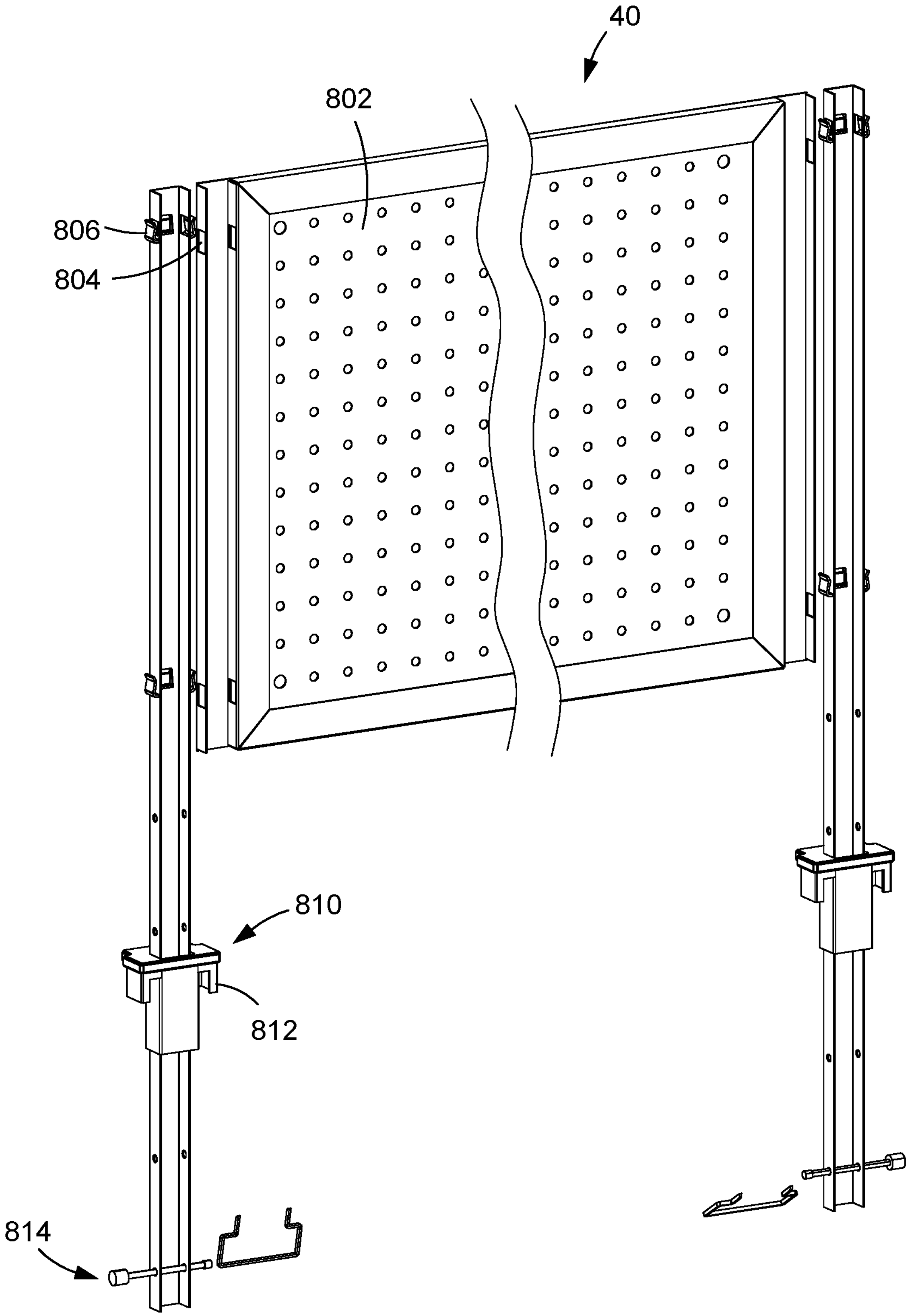
FIG. 11B illustrates additional aspects of a pegboard mounting configuration.

In one embodiment, as best illustrated in FIG. 11B, one or more connectors facilitate connection of the pegboard body 802 to the posts 804. In one embodiment, the connectors comprise clips 806 which extend outwardly from the posts 804 for engagement with a mating apertures 808 in the pegboard body 802. As illustrated, the apertures 808 may be openings in the end portion of the pegboard body 802 which can be passed over the clips 806. When the clips 806 extend upwardly as illustrated, a top portion may define a slot for accepting the side of the pegboard body 802 when it is pressed downwardly onto the post 802.

In embodiment, as illustrated in FIGS. 11A-2, 11A-3 and 11A-4, the posts 804 may be mounted to a workbench or rack, such as via a cap 810. In one embodiment, the cap 810 is configured to engage one of the uprights of the frame of a workbench or rack, such as the uprights of the end frame assemblies 12,14 of the workbench 10 illustrated in FIG. 1. The caps 810 may be configured to fit into the open tops of the uprights, such as including one or more tabs 812 which may be pressed downwardly into the channel formed by the upright. As further illustrated in FIG. 11B, one or more pins 814 or other connectors may be used to further anchor or connect the post 804 to the upright, such as by extending through mating holes therein.

In one embodiment, as illustrated in FIG. 11B, by providing clips 806 on opposing sides of the posts 804, a single post 804 may support a pegboard body 804 on each side. This allows pegboards to be joined, such as in the case of two adjacently placed workbenches 10A,10B such as illustrated in FIG. 11A-5.

As another aspect of the invention, pegboards may be used with one another or associated with workbenches, racks or other elements in other manners.

Figures 1, 12A:
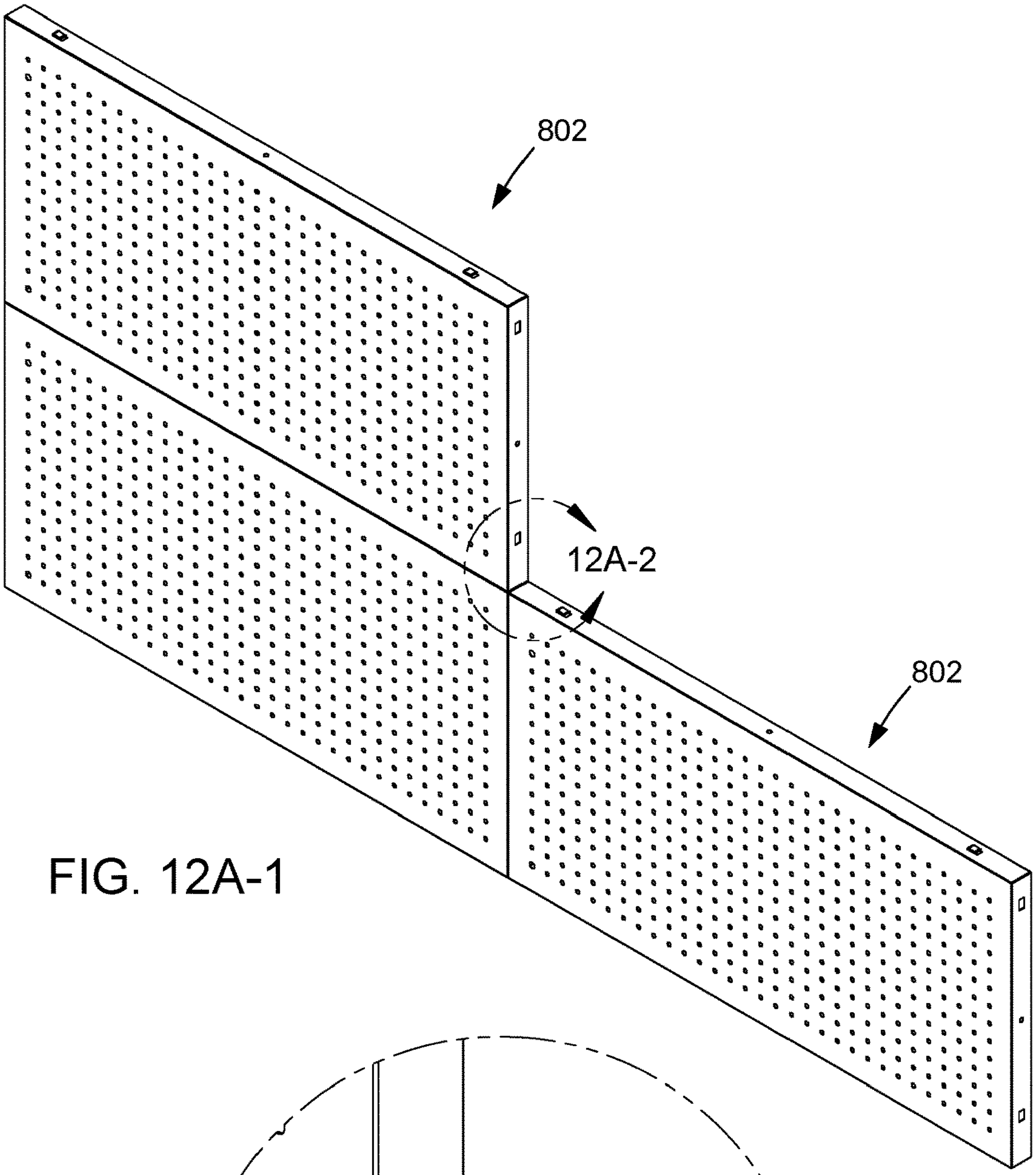
Figures 2, 12A:
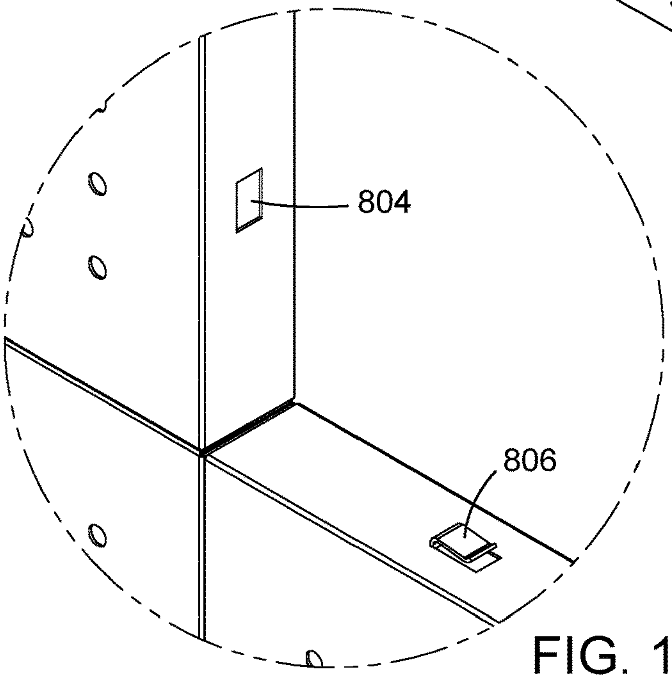
Figures 3, 12A:
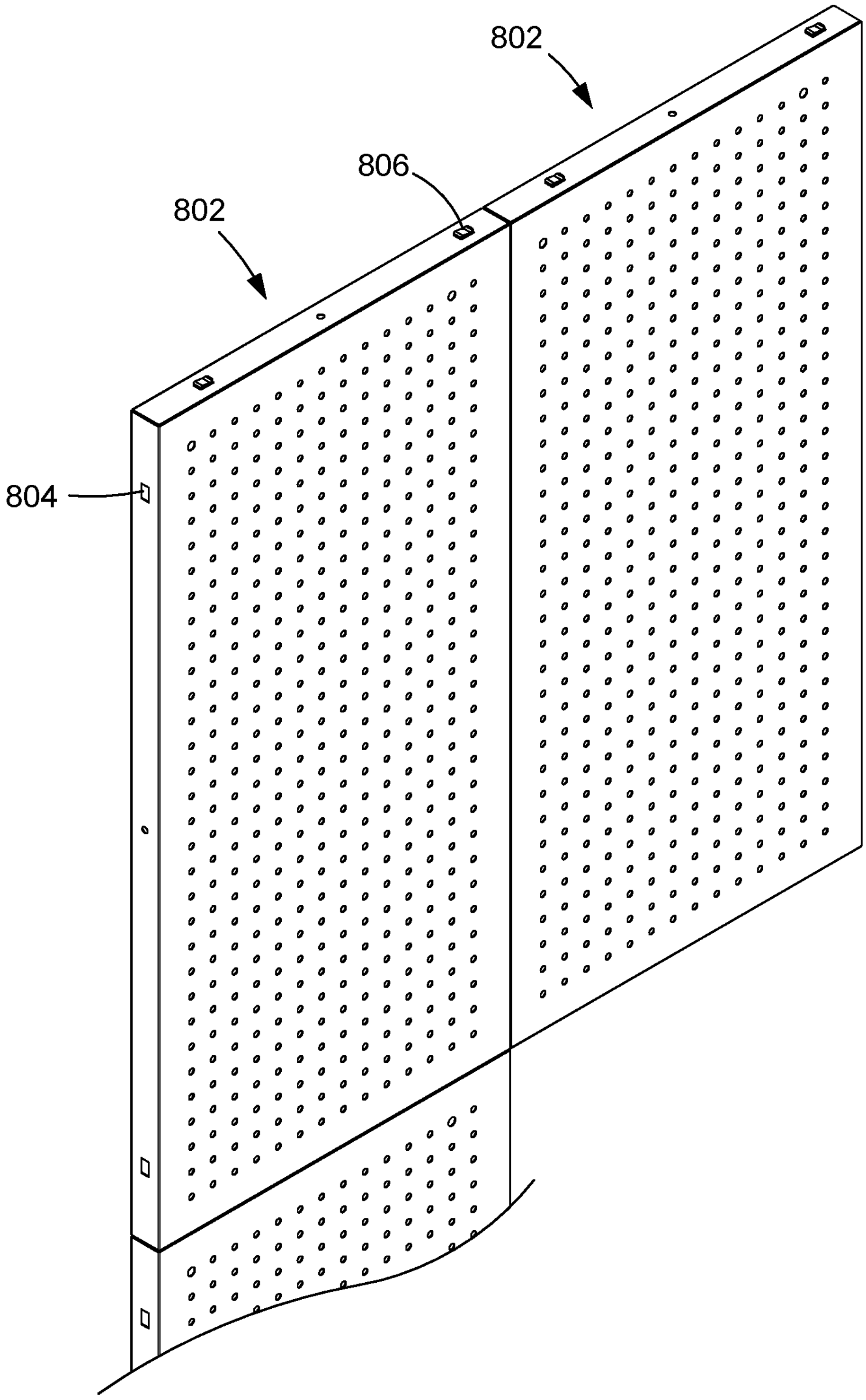

For example, as illustrated in FIGS. 12A-1, 12A-2 and 12A-3, one or more pegboard bodies 802 might be directly joined, such as to form larger assemblies thereof. As illustrated in FIG. 12A-2, the pegboard body 802 may include not only one or more apertures 808, but clips 806 (like those associated with the posts 804 as described above.) The clips 806 and apertures 808 may be positioned on mating pegboard bodies 802 to facilitate mating thereof, such as for selectively joining the pegboard bodies 802. Such an assembly might then be mounted to a wall, a rack or workbench (such as via posts 802, etc.).

The “array” construction of such a pegboard reduces the size of packaging necessary to otherwise ship a large pegboard and prevents damage during shipment by having the large face of the pegboard facing toward each other in the shipping box. The pegboard assembly also has a ratio that fits inside of a drawer for cube savings, and has damage prevention in the bench configuration.

Figures 1, 12B:
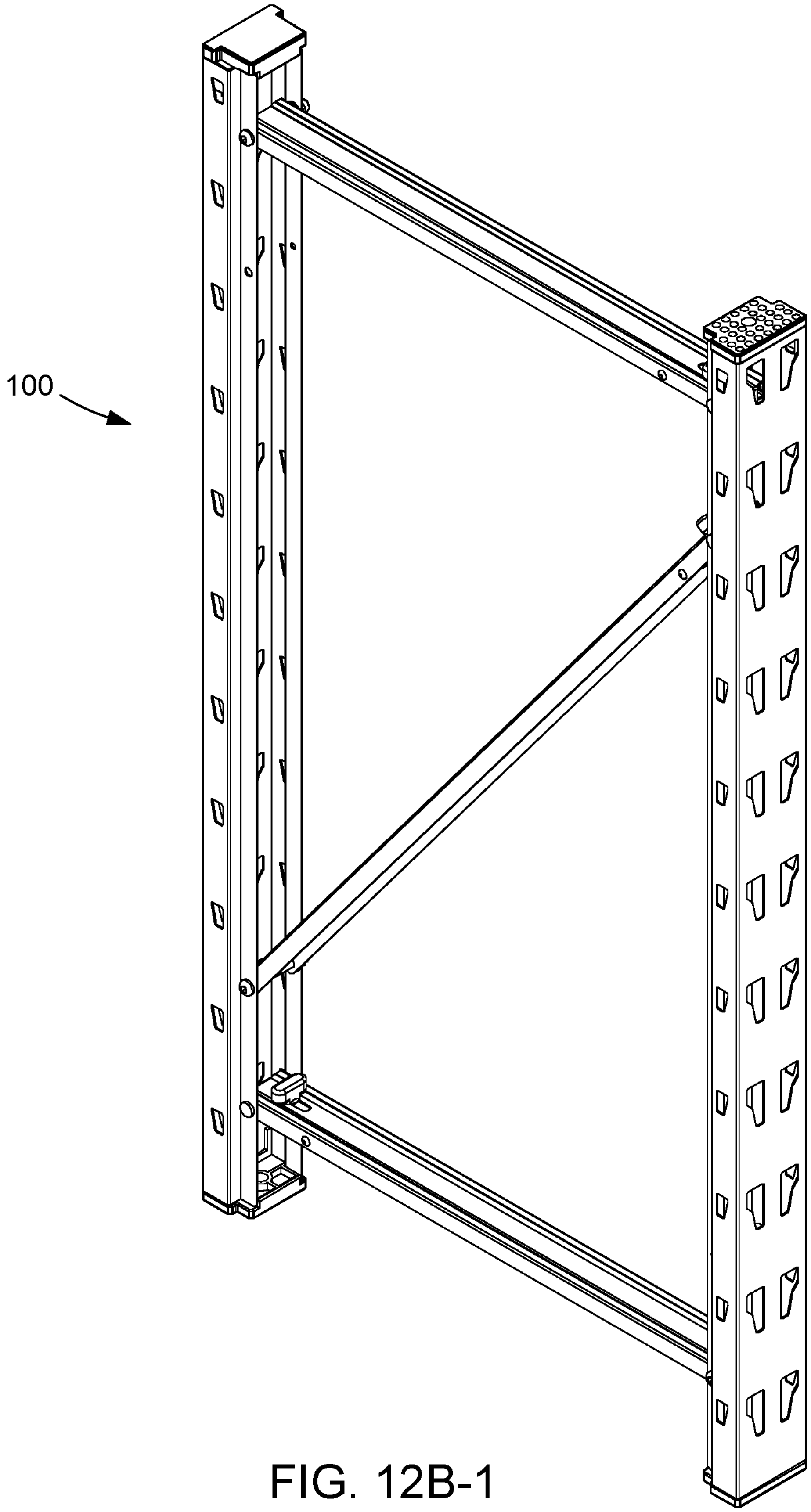
Figures 2, 12B:
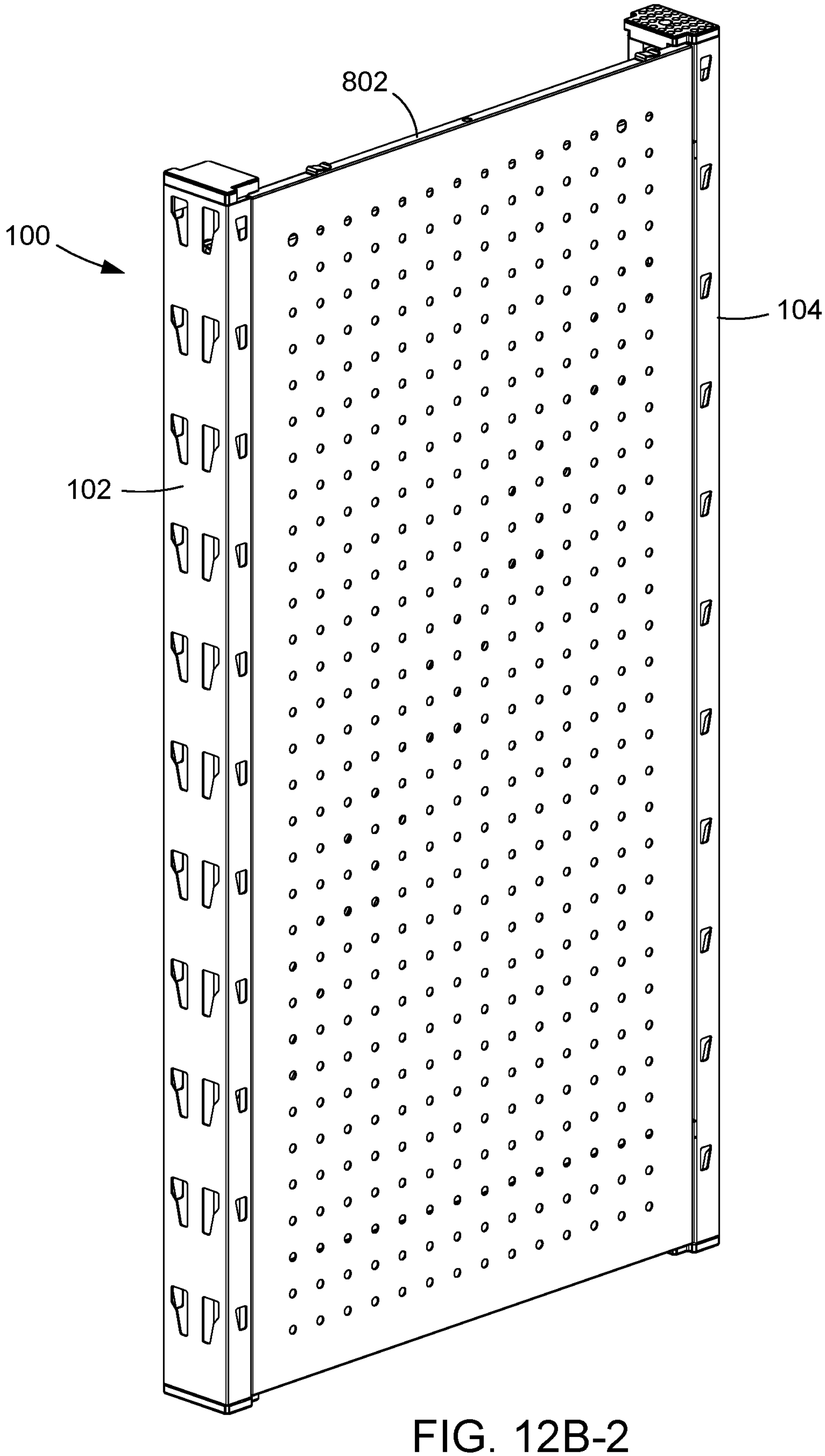
Figures 3, 12B:
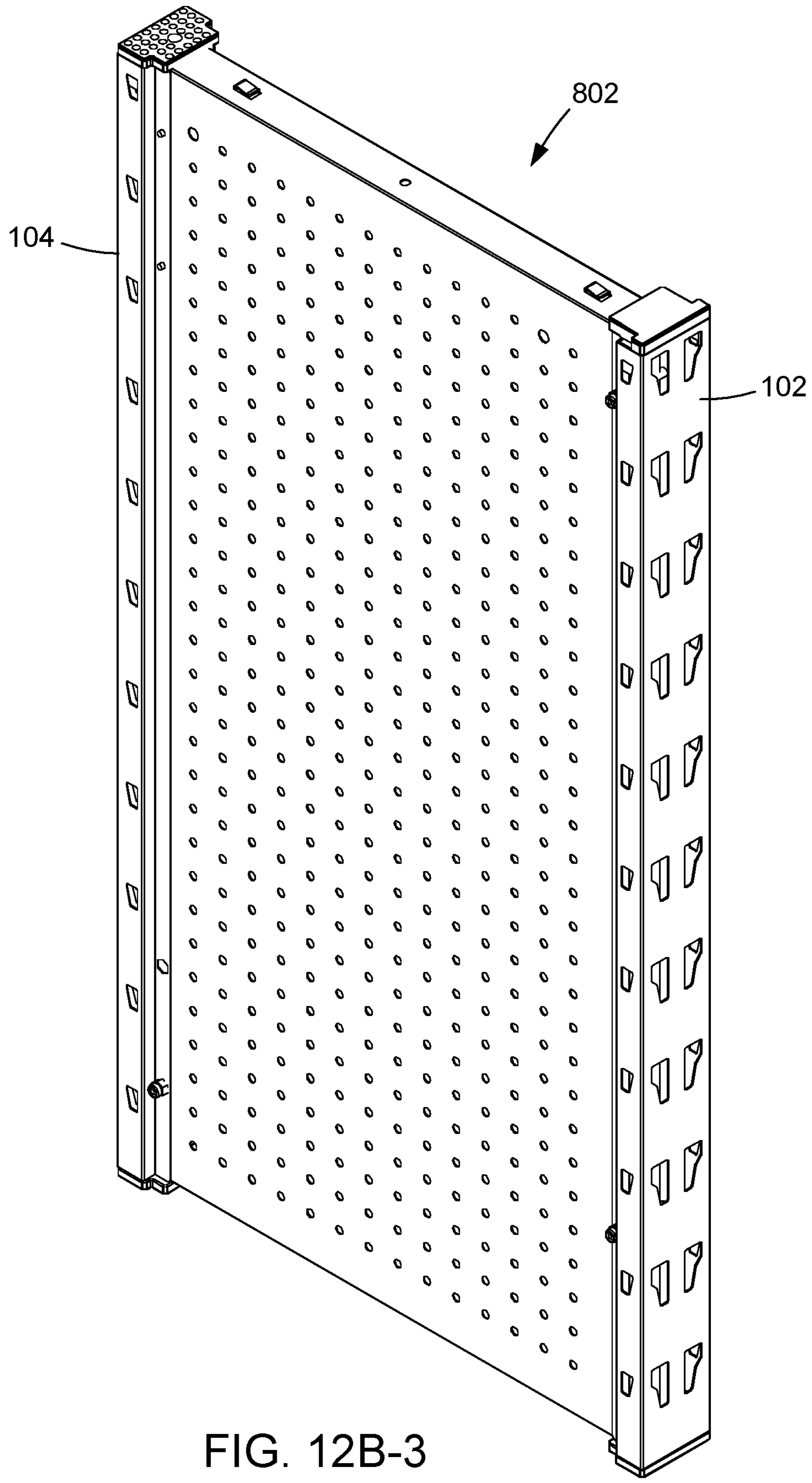
Figures 4, 12B:
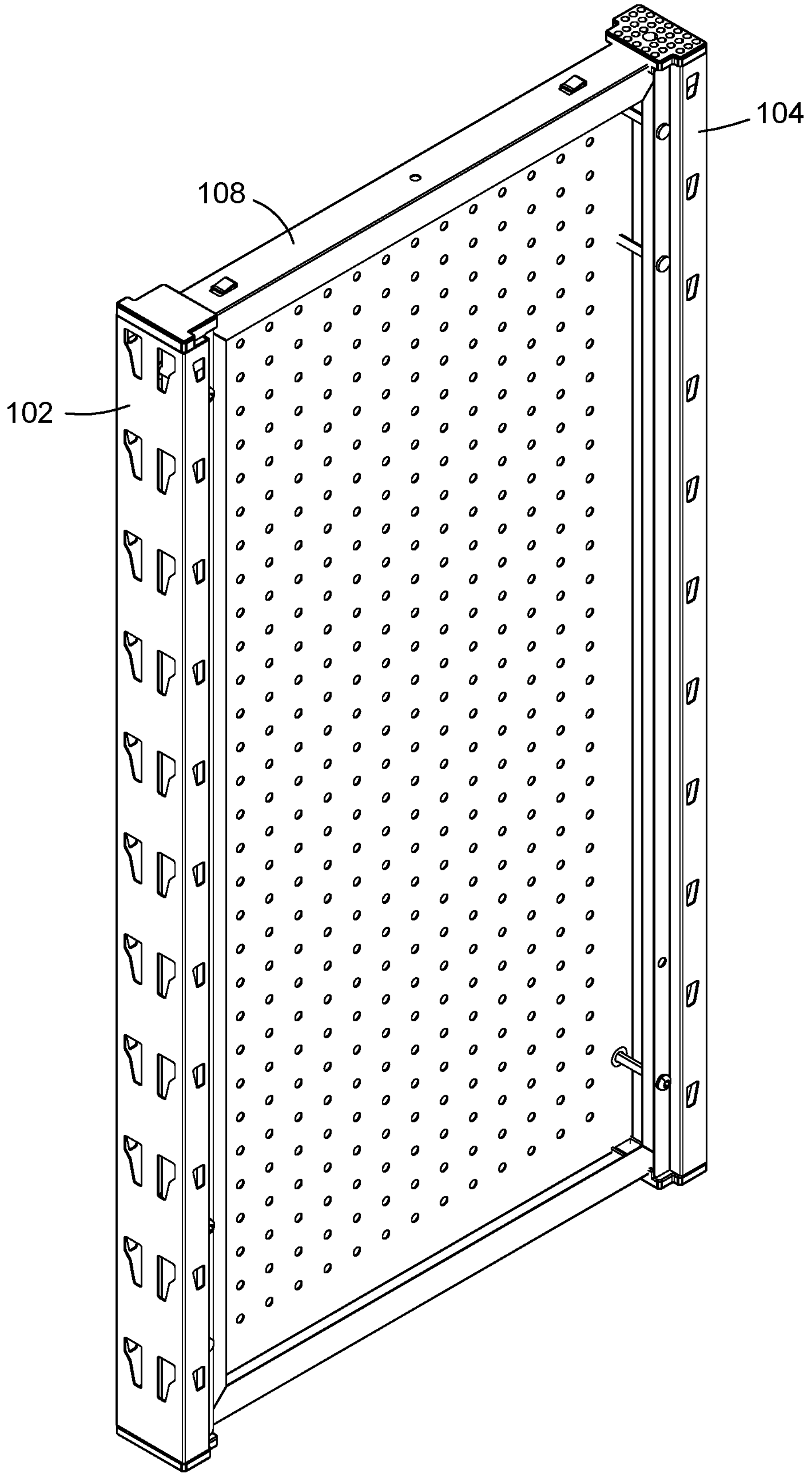

As illustrated in FIGS. 12B1-B4, a pegboard body 802 might be associated with a rack or bench end support, such as a "Z" profile end frame or support 100 such illustrated in FIG. 12B-1 (and described in more detail above, wherein the support 100 illustrated in FIG. 12B-1 is particularly sized for use with a workbench, such as illustrated in FIG. 1).

As illustrated in FIGS. 12B-2, the pegboard body 802 may be constructed to be sufficiently thin that it fits into a channel formed between a front edge of the uprights 102,104 and the central flange thereof. This allows the pegboard body 802 to be flush with the front of the "Z" frame assembly. The pegboard body 802 may be joined to the uprights 102,104, such as by fasteners that pass therethrough and engage the flanges of the uprights 102,104. In this manner, the face of end frame assemblies of a workbench, rack or the like, may be turned into a pegboard.

As illustrated in FIGS. 12B-3 and 12-B4, a pegboard body 802 may be configured as a replacement to the cross-beams of the "Z" frame assembly. In such a configuration, the pegboard body 802 may be located between the first and second uprights 102,104, such as by being located in the channel defined by the flanges thereof and being connected thereto with fasteners.

Figure 13A:
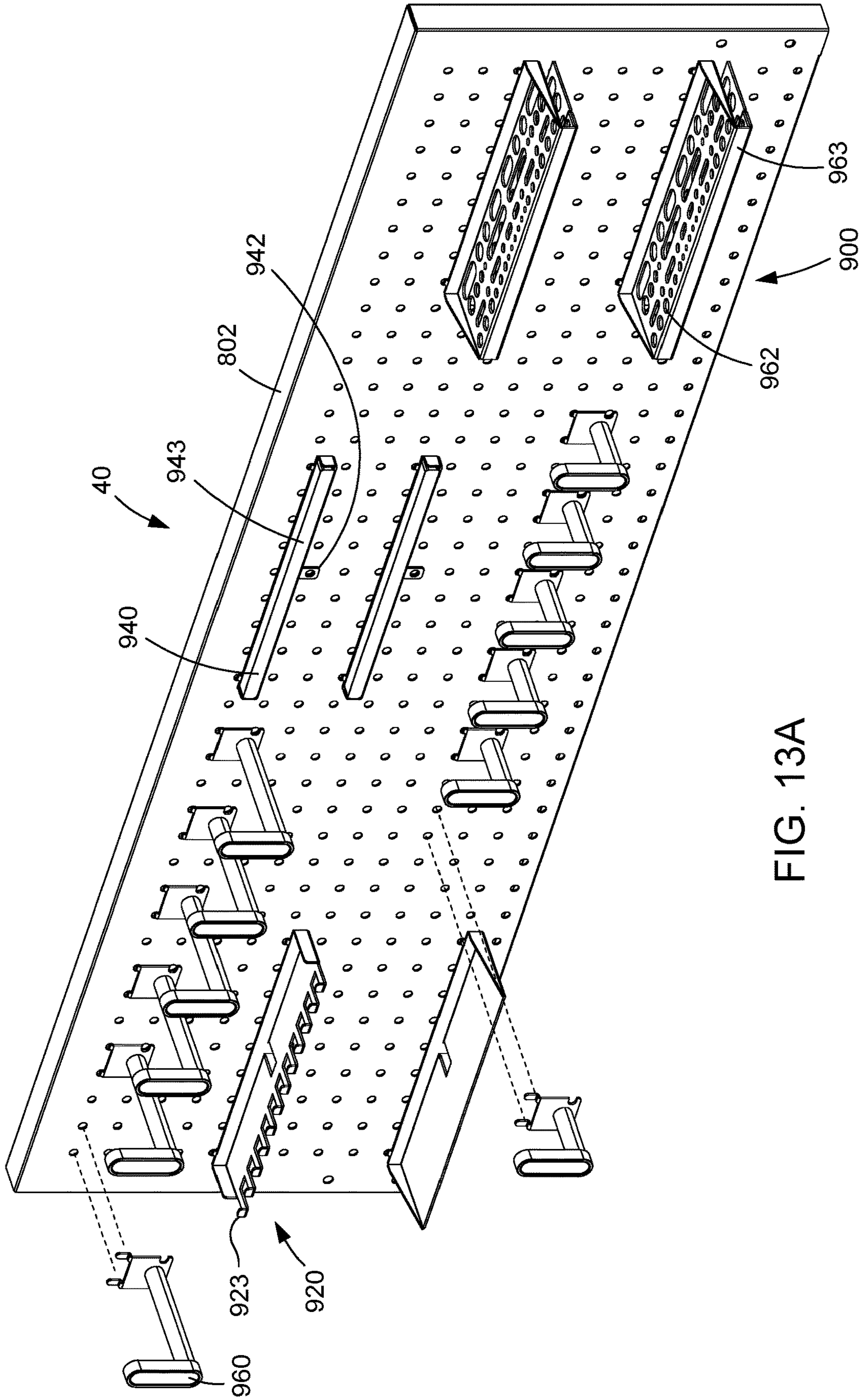
FIG. 13A illustrates embodiments of various pegboard accessories, in accordance with another non-limiting embodiment of the disclosed concept.

Further aspects of the invention comprise tool and work-piece mounts, supports and the like, such as may be connected to or supported by a pegboard or other support, such as a frame element of a rack or workbench, or a wall mount or the like. FIG. 13A illustrates embodiments of various pegboard accessories, such as might be mounted to and supported by a pegboard, including a tray or shelf 900, a combination tray and hanger 920, a magnetic mount 940, and pegboard pegs 960.

The shelf 900 may have a body and one or more a hanger elements or portions (not visible, but which may comprise, for example, tabs which extend outwardly and upwardly from a rear thereof) to allow for connection to (such as hanging on via passages into mating holes in) the pegboard. The body may comprise a shelf 962 that may or may not have a number of holes disposed therethrough and a front panel 963 to allow for branding as well as to allow the tools being stored therein a second point of contact.

The magnetic mount 940 may similarly have one or more hanger portions or elements (such as tabs which extend outwardly and upwardly from a rear thereof for engagement with holes in the pegboard 40, such as at or near both ends of the mount 940). The magnetic mount 940 may further comprise a locking portion 942 through which a member can be inserted in order to prevent pivoting of the magnetic mount 940, and at least one magnet 943.

Still referring to FIG. 13A, the pegboard hanger 920 may again include one or more hangers (such as tabs which extend outwardly and upwardly from a rear portion thereof) for connecting to the pegboard, a locking portion (not visible) through which a member can be inserted in order to prevent pivoting, and a hooked portion 923 on which different tools or other components may be hanged (including where the hooked portion 923 defines a plurality of spaced fingers or the like, such as for accepting the shaft of a tool therebetween).

Figures 1, 13B:
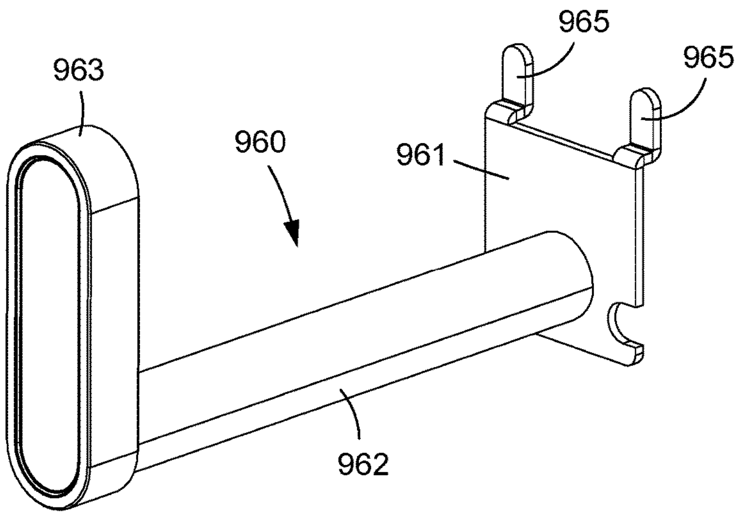
Figures 2, 13B:
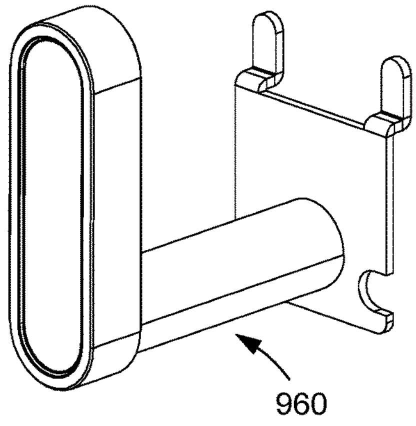
Figures 1, 13C:
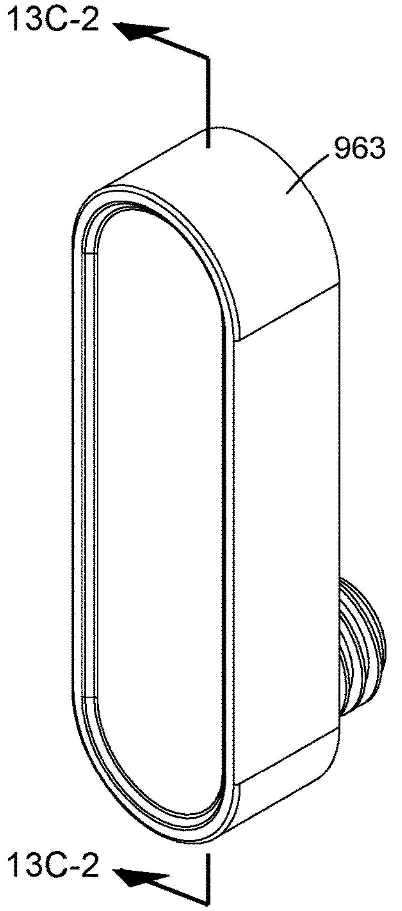
Figures 2, 13C:
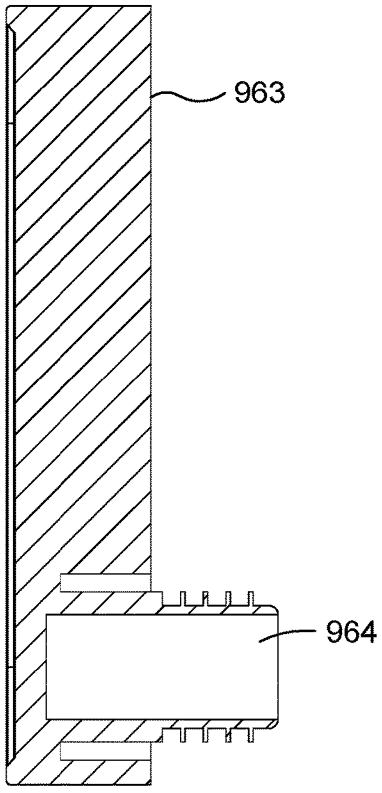

FIGS. 13B-1 and 13B-2 illustrate aspects of a configuration of the pegboard pegs 960 (see also FIG. 13A). As shown, the pegboard peg 960 may have a hanger portion 961 for hanging to the pegboard (or similar element, such as the mounting holes in a workbench or rack frame element). The hanger portion 961 may define one or more tabs 965 which extend outwardly and upwardly from the hanger portion 961, such as for passage into mating holes in the pegboard 40). The pegs 960 may further comprise a shaft portion 962 (which may be configured as a tube) extending from the hanger portion 961, and an end cap 963 coupled to the shaft portion 962. A threaded fastener 964 may also be used to couple the shaft portion 962 to the end cap 963. The end cap 963 might comprise an elongated element, and might swivel or turn as detailed below, or might comprise a simple cap.

As illustrated in FIGS. 13B-1 and 13B-2, the length of the shaft portion 962 may vary, such as to change the distance of the end cap 963 from the pegboard 40. Further, the shape of the end cap 963 may vary. In the configuration illustrated, the end cap 963 is generally oval. However, it might have other shapes (circular, square, etc.).

Figure 14A:
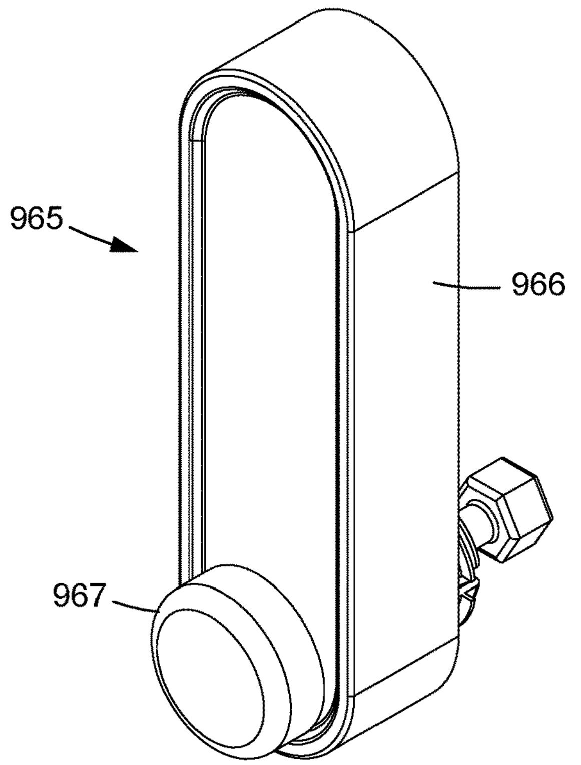
FIGS. 14A-C are isometric, bottom, and section views, respectively, of mounting member in accordance with another non-limiting embodiment of the disclosed concept.
Figure 14B:
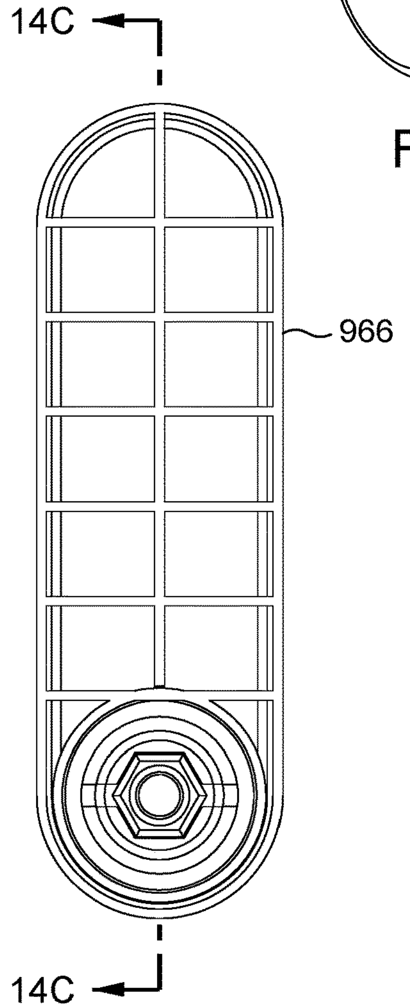
Figure 14C:
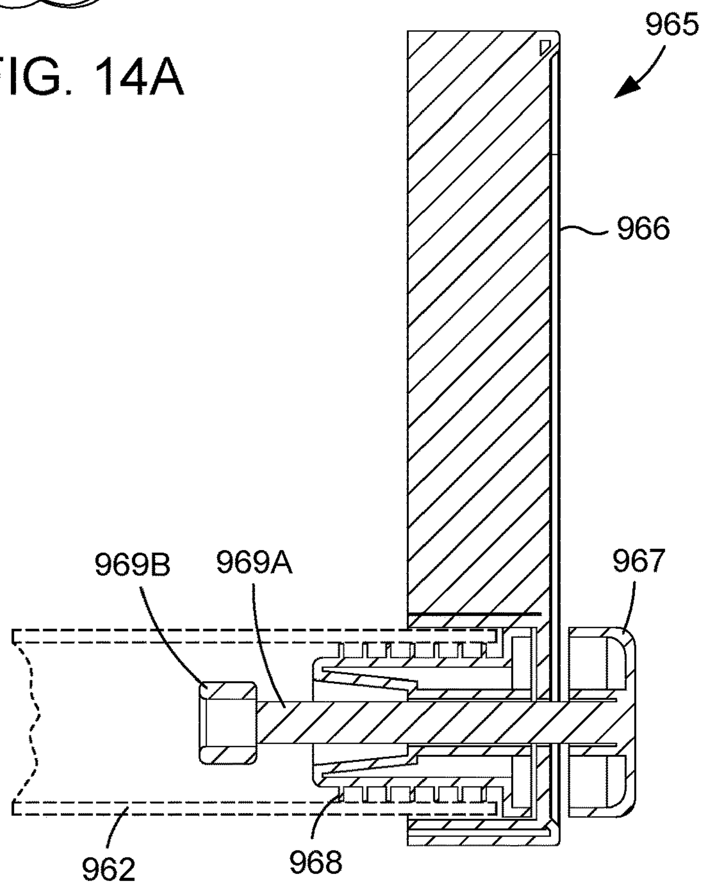

FIGS. 14A-C show an example a swivel peg 965 that may be mounted to a pegboard 40 or the like. The swivel peg 965 has an arm or stop 966 (the shape of which may vary) which is rotatable. The swivel peg 965 has a portion which fits over a locking member 968. A handle 967 is connected to or has a stud 969A extending therefrom and an associated nut 969B. The stop 966, stud 969A and nut 969B may be located in a shaft or tube 962, such as described above. The stop 968 includes a tapered opening for receiving the nut 969B, whereby when the user turns the handle 967, the nut is drawn inwardly and causes the stop 966 to be pressed outwardly. The stop 968 is thus pressed against the inside of the shaft or tube 962, thus locking the position of the arm 966.

In this configuration, a user may turn the arm 966 to a desired position, such as across the front of a workpiece or tool which is located along the pegboard 40. The user may then tighten the handle 967 in order to tighten the arm 966 into a fixed position. However, the user may also loosen the handle 967 in order to move the arm 966 to another position. Of course, other mechanisms may be provided which allow the arm 966 to be position-adjustable, such as by including a locking mechanism or the like.

Figure 15A:
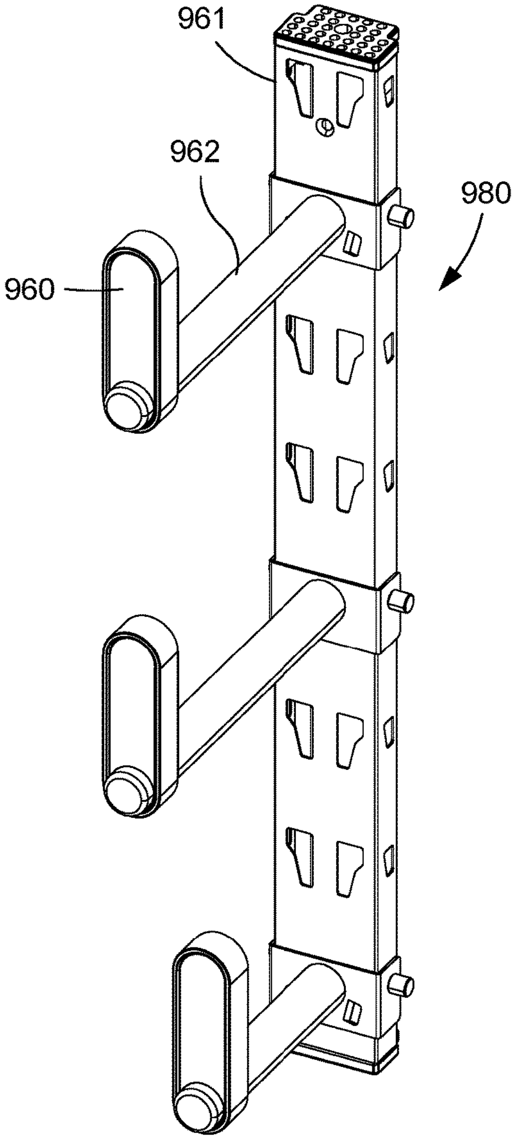
FIGS. 15A and 15B show different isometric views of a configuration in which a mount may include elongated frame sections, in accordance with another non-limiting embodiment of the disclosed concept.
Figure 15B:
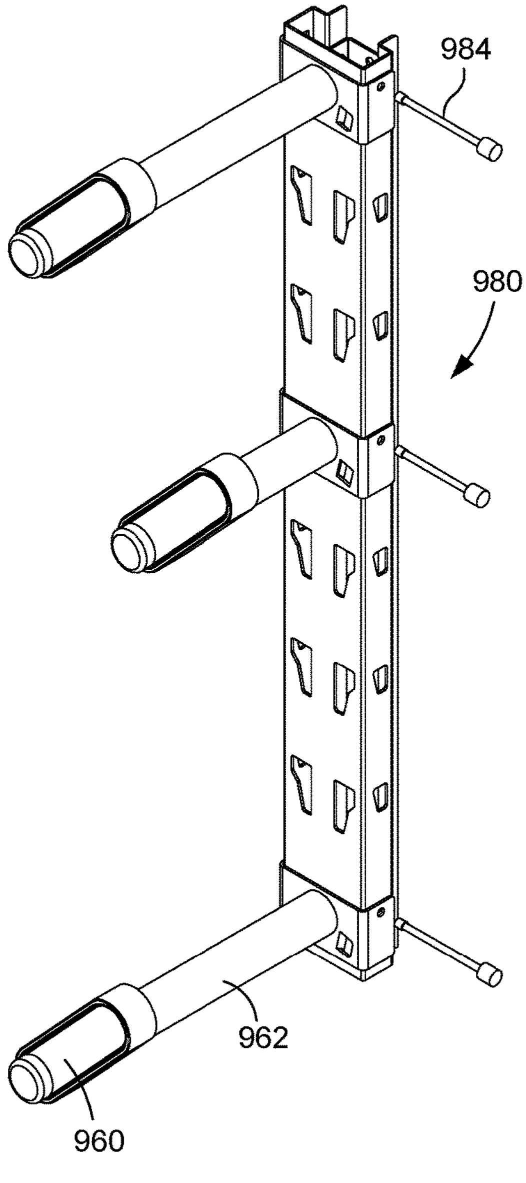

As indicated above, the various features might be mounted to other than a pegboard, such as a frame element, mount or the like. For example, FIGS. 15A and 15B show a configuration in which a mount 980 may comprise an elongate frame or beam section (e.g. similar in configuration to a portion of one of the end support uprights 102,104 as illustrated in FIG. 3C and described above, such as defining a plurality of spaced mounting apertures). This mount 980 may be mounted, for example, to a wall of the like. When mounted in a vertical direction, the mount allows items to be connected at different vertical heights. The mount 980 may, for example, be mounted to a wall using one or more wall mount brackets 982, such as illustrated in FIG. 16. Such a wall mount bracket 982 may be connected to a wall (or other support structure), such as by passing a fastener through one or more of holes 981 in a rear 983 of the mount 982. Then, the mount 980 may be hung on the bracket by locating it in the channel 985 defined by the mounting bracket 982 (and then passing a pin, such as pin 984 shown in FIG. 15D, through aligned holes in the sides of the mount 980 and mounting bracket 982). In one configuration, the pin 984 that is placed thought the bracket 982 prevents the mount 980 from disengaging and is an improvement of other like items as it allows the mounting bracket 982 to use less material than conventional brackets which span two sets holes in mounting track. The through hole in the mounting bracket 982 preferably has a draft applied that pull the hanging bracket toward the wall and prevents delamination and tab deformation while under load.

Figure 15C:
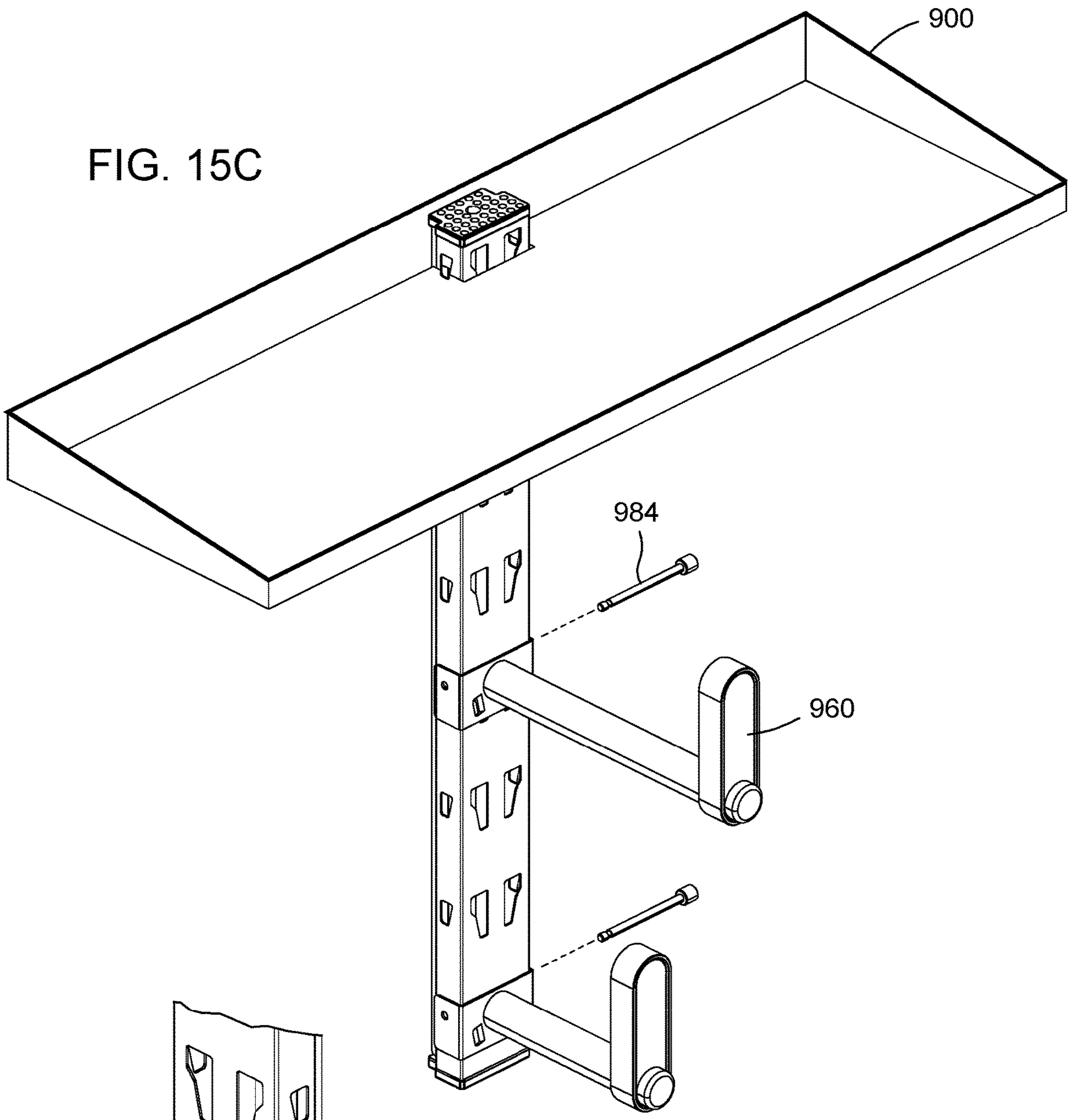
FIGS. 15C and 15D shows another embodiment of the use of a wall mount which includes mounting pegs and a shelf.
Figure 15D:
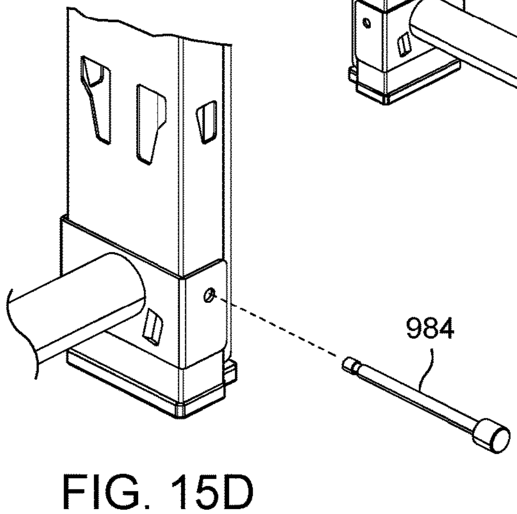
Figure 16:
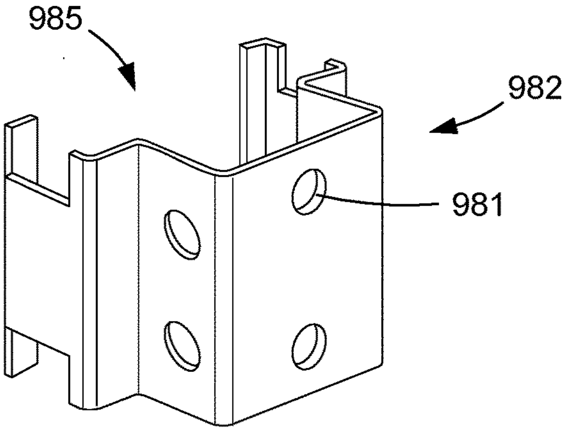
FIG. 16 illustrates a wall beam mounting bracket in accordance with an embodiment of the concept.

As illustrated in FIGS. 15A-D, the mount 980 can be used to support or connect various features, such as pegs 960 (such as similar to those illustrated in FIGS. 13B1 and 13B2), and other elements—all of which might also might be interchangeably mounted to a corresponding rack or bench having similar uprights as described herein. For example, FIG. 15C shows an embodiment of the use of a wall mount where two pegs 960 are mounted to the mount 980, as well as a shelf 900. The shelf 900 might be removably mounted to the mount, such as via a stack bracket. In one configuration, the shelf 900 is advantageously configured to allow the upright to fit inside of the box during shipping. As illustrated, elements may be easily mounted to the mount 980, such as with tabs located on a portion thereof which engages the openings in the face and/or sides of the mount 980 (and may thus preferably also be connectable to the uprights of the workbench or rack herein). Further, these elements may be connected to the wall mount 980 by one or more locking pins 984, such as by passing a pin 984 through mating holes in the element which is being mounted and in the passages or holes through the sides of the mount 980.

Of course, the features which may be mounted to the mount 980 may vary. For example, a peg or pin 960 having an associated arched support may be mounted to the mount 980 and be used to support a garden hose thereon, etc.

Figure 17:
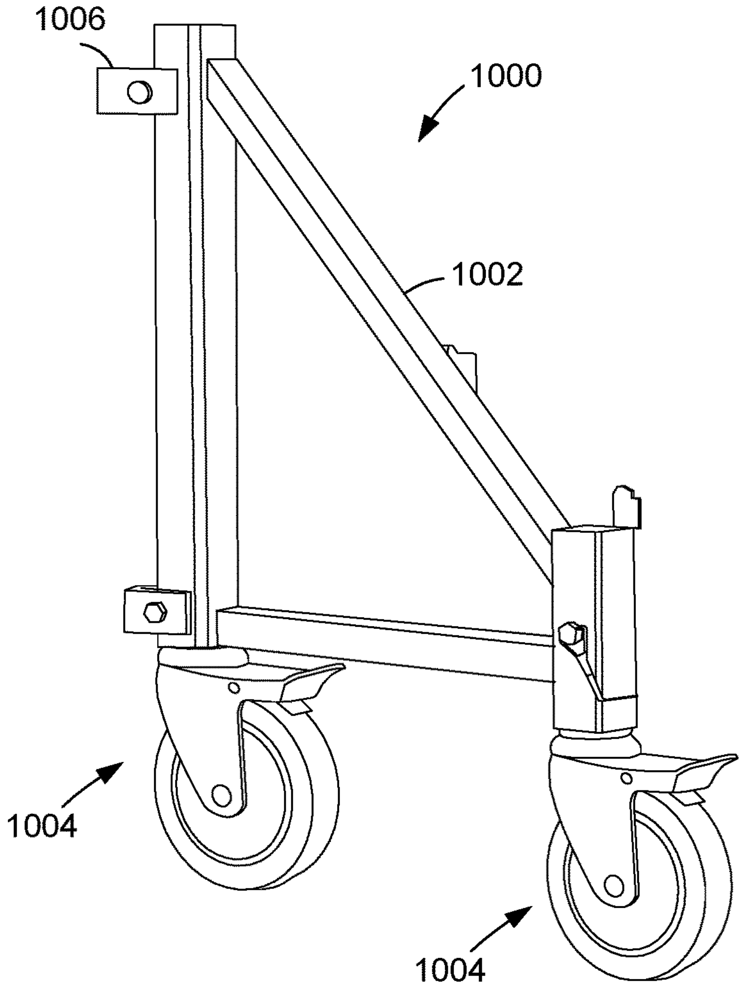
FIG. 17 is an isometric view of an outrigger support, in accordance with another non-limiting embodiment of the disclosed concept.

Another aspect of the invention comprises an outrigger support for a workbench, rack of the like. As illustrated in FIG. 17, the outrigger support 1000 may be wheeled. As illustrated, the outrigger support 1000 may comprise a frame 1002, such as a generally triangular frame. The frame 1002 may be supported by wheels, such as braked casters 1004. As illustrated, the casters 1004 may be located in spaced positions to provide stable support to the outrigger 1000.

In one embodiment, the outrigger 1000 includes one or more connectors or mounts 1006, such as for connected the outrigger 1000 to a workbench, rack or the like. For example, the outrigger 1000 may be selectively connected to the end supports of a rack as described herein. When a pair of outriggers 100 are mounted to the end supports, the rack may more easily be moved from location to location.

Figure 18:
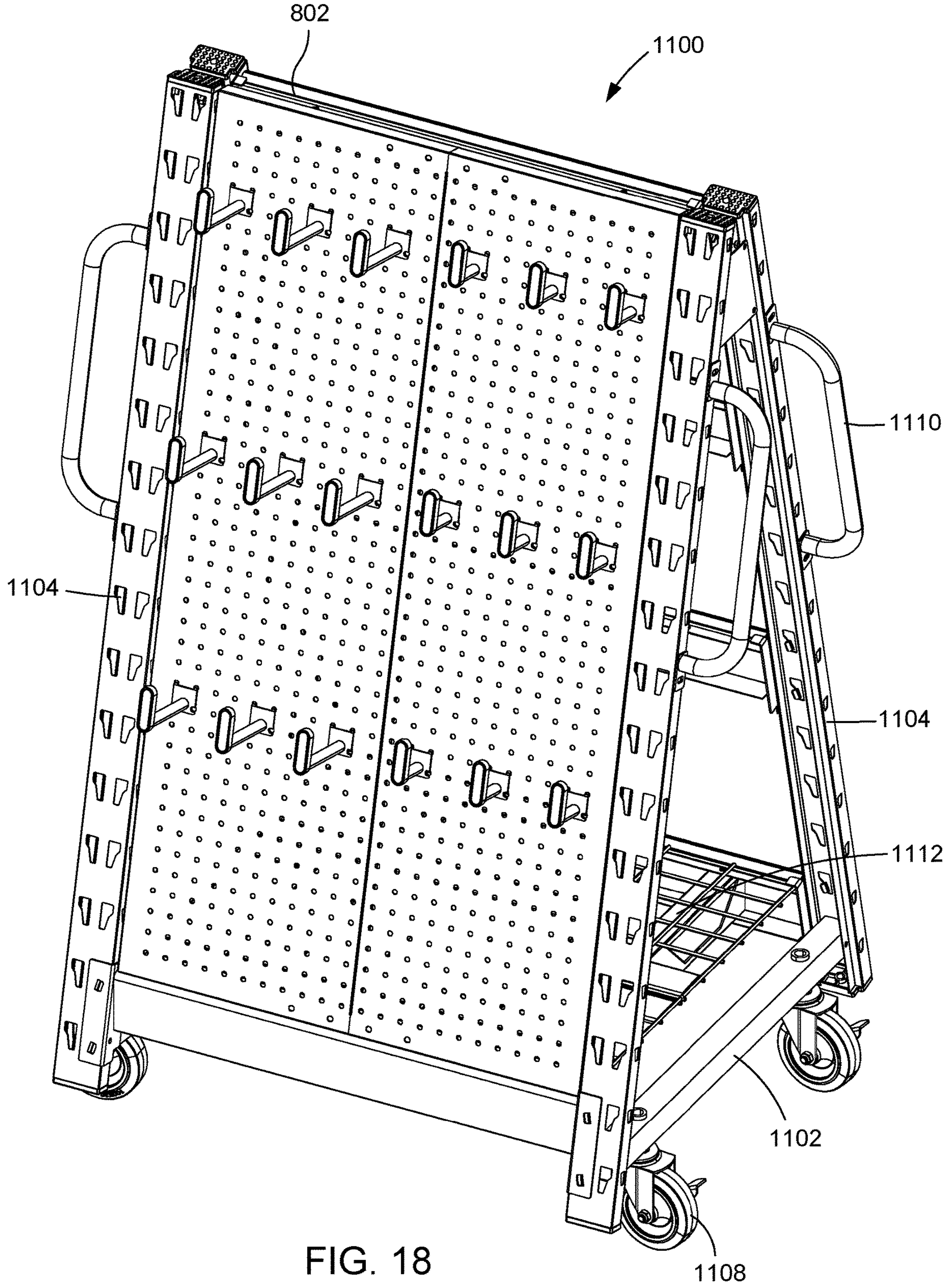
FIG. 18 is an isometric view of a woodworking clamping cart, in accordance with another non-limiting embodiment of the disclosed concept.

As indicated herein, aspects of the invention may be applied to workbenches, racks or other elements having other configurations. For example, FIG. 18 illustrates a wood working clamping cart 1100. The cart 1100 may comprise a frame, such as comprising a base or one or more lower supports 1102, and one or more uprights 1104. In the embodiment illustrated, pairs of uprights 1104 are located at opposing ends of the cart 1100 and are angled inwardly towards one another, thus forming a generally "A" shape.

As illustrated, pegboard bodies 802, such as described above, might be connected to the frame, such as to the uprights 1104. Further, one or more of the pegboard accessories described herein might be used with the pegboard bodies 802.

The cart 1100 might include other features, such as wheel/casters 1108 for rollably supporting it, and one or more handles 1110 for gripping by a user. In one embodiment, the base or lower supports 1102 might support a shelf or deck, such as a wire deck 1112 (which might comprise a split wire deck having portions joined with a wire deck bracket as described above).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A rack assembly comprising:

a first end support and a second end support, each end support comprising:
 a first upright;
 a second upright; and
 a cross member coupled to and extending between the first and second uprights; and a plurality of shelf beams extending between the first and second end supports, each shelf beam comprising a beam portion having a first end, a second end, a front face, a top flange extending rearwardly from said front face, a bottom flange extending rearwardly from said front face and spaced from said top flange so that said shelf beam defines a generally U-shaped channel at a rear of said front face, and a mounting bracket located at said first end and said second end of said beam portion, each mounting bracket comprising a body defining a U-shaped notch which is aligned with said U-shaped channel of said beam portion.

2. The rack assembly according to claim 1, wherein each mounting bracket comprises a front leg and a side leg extending from the front leg and being perpendicular with respect thereto, and wherein the U-shaped notch is located in the side leg.

3. The rack assembly according to claim 2, wherein each mounting bracket further comprises a number of protruding tabs each extending outwardly from the front leg in the same direction as said side leg and being configured for engagement with a corresponding mating hole in either of the first or second uprights of one of the end supports.

4. The rack assembly according to claim 3, wherein the cross member is a first cross member, and further comprising a second cross member and a third cross member, wherein the first and second cross members each extend between and are disposed perpendicular to each of the first and second uprights, and wherein the third cross member is a diagonal cross member extending between the first and second uprights, and extending from proximate the first cross member to proximate the second cross member.

5. The rack assembly according to claim 1, wherein the mounting brackets are welded to the first and second ends of the beam portion.

6. A wire deck, comprising:

a first wire deck portion;

a second wire deck portion; and a wire decking bracket comprising a base plate, a first tab extending outwardly from the base plate and configured to engage the first wire deck portion, a second tab extending outwardly from the base plate and configured to engage the second wire deck portion and a third tab extending outwardly from the base plate and positioned between the first tab and the second tab, the third tab configured to engage both the first wire deck portion and the second wire deck portion in order to join the wire decking bracket to the first and second wire deck portions in a manner which maintains the first and second wire deck portions in planar alignment to one another and parallel to said base plate of said wire decking bracket.

7. The wire deck according to claim 6, wherein the first and second wire deck portions are hinged together in order to allow a width of the wire deck to be reduced and said third tab engages said first wire deck portion and said second wire deck portion at said hinge.

8. The wire deck according to claim 6, wherein the first, second and third tabs are engaged in a snap-action manner with the first and second wire deck portions, respectively, and wherein the first, second and third tabs are each either C-shaped or L-shaped.

9. The wire deck according to claim 6, wherein the first, second and third tabs all define receiving openings facing in the same direction, permitting each of said first, second and third tabs of said wire decking bracket to be engaged with said first and second wire deck portions by moving said wire decking bracket linearly relative to said first and second wire deck portions.

10. The wire deck according to claim 6 wherein the first, second and third tabs are configured to exert a biasing force on the corresponding first and second wire deck portions.

11. The wire deck according to claim 10, wherein said base plate of said wire decking bracket, said first tab, said second tab and said third tab are constructed from metal and further comprising a pliable insert located between each of said first tab, said second tab and said third tab and the base plate, which pliable insert exerts said biasing force.

12. The wire deck according to claim 6, wherein each of said first tab, said second tab and said third tab cooperate with said base plate to define a wire deck accepting slot.

13. A racking assembly comprising:

at least a first upright and a second upright, each upright having a front face and a side extending generally perpendicular to said front face and having a plurality of mounting holes located in said front face;

a plurality of shelf beams for connection to said first and second uprights, said shelf beam comprising a beam portion having a first mounting bracket at a first end and a second mounting bracket at a second end, said beam portion comprising a front face, a top flange extending rearwardly from said front face, and a bottom flange extending rearwardly from said front face and spaced from said top flange to define a generally U-shaped channel at a rear of said front face, and each mounting bracket having a front leg and a side leg extending generally perpendicular to said front leg, a U-shaped notch located in said side leg which is aligned with said U-shaped channel of said beam portion, and a least one tab protruding rearwardly from said front leg, whereby when each mounting bracket is connected to one of said first and second uprights, said front leg thereof is positioned adjacent said front face with said at least one tab engaging at least one of said plurality of mounting holes and said side leg thereof is positioned adjacent said side of said upright.

14. The racking assembly in accordance with claim 13, wherein said side leg of each mounting bracket has a front and a rear, wherein said an end of said beam portion is connected to said front of said side leg and said rear of said side leg faces said upright when said beam is connected to one of said first or second uprights.

* * * * *